(12) United States Patent
Xu et al.

(10) Patent No.: US 10,942,390 B2
(45) Date of Patent: Mar. 9, 2021

(54) DISPLAY SUBSTRATE AND FABRICATING METHOD THEREOF, AND DISPLAY PANEL

(71) Applicants: Hefei BOE Optoelectronics Technology Co., Ltd., Hefei (CN); BOE TECHNOLOGY GROUP CO., LTD., Beijing (CN)

(72) Inventors: Xufei Xu, Beijing (CN); Na Zhao, Beijing (CN); Gangqi Huang, Beijing (CN); Chuanyan Wang, Beijing (CN); Gaofei Shi, Beijing (CN); Qiyu Shen, Beijing (CN)

(73) Assignees: Hefei BOE Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/457,430

(22) Filed: Jun. 28, 2019

(65) Prior Publication Data
US 2020/0225534 A1 Jul. 16, 2020

(30) Foreign Application Priority Data
Jan. 14, 2019 (CN) .......................... 201910031490.4

(51) Int. Cl.
| | | |
|---|---|---|
| *G02F 1/1335* | (2006.01) | |
| *G02F 1/1337* | (2006.01) | |
| *G02F 1/1343* | (2006.01) | |
| *G02F 1/1362* | (2006.01) | |

(52) U.S. Cl.
CPC .. *G02F 1/133528* (2013.01); *G02F 1/133512* (2013.01); *G02F 1/133514* (2013.01); *G02F 1/133711* (2013.01); *G02F 1/133788* (2013.01); *G02F 1/134309* (2013.01); *G02F 1/136286* (2013.01); *G02F 2201/121* (2013.01); *G02F 2201/123* (2013.01)

(58) Field of Classification Search
CPC ......... G02F 1/133528; G02F 1/133512; G02F 1/133514; G02F 1/133711; G02F 1/133788; G02F 1/134309; G02F 1/136286; G02F 2201/121; G02F 2201/123; G02F 2001/133548
See application file for complete search history.

(56) References Cited

U.S. PATENT DOCUMENTS

2002/0167619 A1* 11/2002 Bietsch ............. G02F 1/133621 349/1
2018/0052348 A1* 2/2018 Park .................. G02F 1/133707

* cited by examiner

*Primary Examiner* — Nathanael R Briggs
(74) *Attorney, Agent, or Firm* — Thomas|Horstemeyer, LLP

(57) ABSTRACT

Embodiments of the present invention provide a display substrate, a fabricating method thereof, and a display panel. The display substrate includes a substrate, a display structure layer disposed on the substrate, and an alignment layer. A grating polarizing layer is disposed in the display structure layer, and an optical alignment direction of the alignment layer is parallel to or perpendicular to a transmission axis direction of the grating polarizing layer.

18 Claims, 11 Drawing Sheets

DISPLAY SUBSTRATE AND FABRICATING METHOD THEREOF, AND DISPLAY PANEL

CROSS-REFERENCE TO RELATED APPLICATION

The present application is based on and claims the benefit of and priority to Chinese Patent Application No. 201910031490.4, filed on Jan. 14, 2019, the entire contents of which being incorporated herein by reference.

TECHNICAL FIELD

The present disclosure relates to the field of display technologies and, in particular, to a display substrate, a fabricating method thereof, and a display panel.

BACKGROUND

Liquid crystal display (LCD) devices, such as a flat panel display device, have been rapidly developed in recent years and increasingly applied to the field of high performance display, notably, due to its small size, low power consumption, non-radiative characteristics, and relatively low production cost.

SUMMARY

An embodiment of the present disclosure provides a display substrate including a base, a display structure layer disposed on the base, and an alignment layer. A grating polarizing layer is disposed in the display structure layer. An optical alignment direction of the alignment layer is parallel to or perpendicular to a transmission axis direction of the grating polarizing layer.

Optionally, a material of the grating polarizing layer includes at least one of aluminum, silver, molybdenum, gold, copper, chromium, silicon nitride, silicon oxide, silicon oxynitride, acryl resin, polyimide resin, black matrix material, indium tin oxide, and indium zinc oxide.

Optionally, the grating polarizing layer is disposed at an effective display area in each of sub-pixels, and the grating polarizing layer has a grating period of less than 400 nm with a duty ratio of 0.4 to 0.6.

Optionally, the grating polarizing layer includes a plurality of grating strips disposed in parallel and periodically arranged.

Optionally, the alignment layer includes a photodegradable type material, and the optical alignment direction of the alignment layer is perpendicular to the transmission axis direction of the grating polarizing layer; or the alignment layer includes a photopolymerizable type material, and the optical alignment direction of the alignment layer is parallel to the transmission axis direction of the grating polarizing layer.

Optionally, the grating polarizing layer forms different grating directions in the same sub-pixel or adjacent sub-pixels according to domains, and the alignment layer forms alignments in different directions in the same sub-pixel or adjacent sub-pixels to realize a two domain or multi domain pixel structure.

Optionally, the display substrate includes an array substrate, the display structure layer includes an array structure layer, and grating lines or data lines in the grating polarizing layer and the array structure layer are disposed in the same layer and are formed by one patterning process.

Optionally, the display substrate includes an array substrate, the display structure layer includes an array structure layer, and pixel electrodes or common electrodes in the grating polarizing layer and the array structure layer are integrally formed and are formed by one patterning process.

Optionally, the display substrate includes a color filter substrate, the display structure layer includes a color filter structure layer, and black matrices in the grating polarizing layer and the color filter structure layer are disposed in the same layer and are formed by one patterning process.

An embodiment of the present disclosure also provides a display panel including any of the above-mentioned display substrates.

In order to solve the above technical problem, an embodiment of the present disclosure further provides a fabricating method of a display substrate including:

forming a display structure layer on the base, in which a grating polarizing layer is formed; and coating an alignment liquid, irradiating with ultraviolet light from a surface at a side of the base away from the alignment liquid to form an alignment layer, and an optical alignment direction of the alignment layer being parallel to or perpendicular to a transmission axis direction of the grating polarizing layer.

Optionally, the alignment layer includes a photodegradable type material, and the optical alignment direction of the alignment layer is perpendicular to the transmission axis direction of the grating polarizing layer; or the alignment layer includes a photopolymerizable type material, and the alignment direction of the alignment layer is parallel to the transmission axis direction of the grating polarizing layer.

Optionally, the ultraviolet light is unpolarized ultraviolet light.

Optionally, the display substrate includes an array substrate, the display structure layer includes an array structure layer, grating lines or data lines in the grating polarizing layer and the array structure layer are disposed in the same layer and are formed by one patterning process; or, pixel electrodes or common electrodes in the grating polarizing layer and the array structure layer are integrally formed and are formed by one patterning process.

Optionally, the display substrate includes a color filter substrate, the display structure layer includes a color filter structure layer, and black matrices in the grating polarizing layer and the color filter structure layer are disposed in the same layer and are formed by one patterning process.

BRIEF DESCRIPTION OF THE DRAWINGS

The drawings are used to provide a further understanding of the technical solutions of the present disclosure, and constitute part of the specification. Also, the drawings are used to explain the technical solutions of the present disclosure together with the embodiments of the present application, and do not constitute limitations on the technical solutions of the present disclosure. The shapes and sizes of various components in the drawings do not reflect true proportions, and are merely intended to schematically illustrate the present disclosure.

DETAILED DESCRIPTION

The specific implementations of the present disclosure are further described in detail below with reference to the accompanying drawings and embodiments. The following embodiments are intended to illustrate the present disclosure, but are not intended to limit the scope of the present disclosure. It should be noted that the features in the embodiments and the embodiments in the present application may be arbitrarily combined with each other without any conflict.

Figure 1:
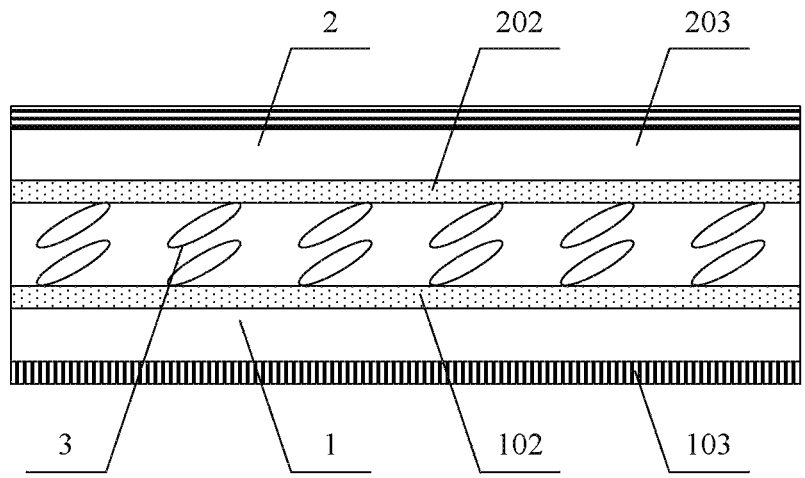
FIG. 1 is a schematic structural view of a conventional liquid crystal display panel.

FIG. 1 is a schematic structural view of a conventional liquid crystal display panel. As shown in FIG. 1, the main structure of the liquid crystal display panel includes a Thin Film Transistor (TFT) substrate 1 and a Color Filter (CF) substrate 2 that are disposed in a cell manner (i.e., oppositely disposed), and a Liquid Crystal (LC) layer 3 is disposed between the array substrate 1 and the color filter substrate 2, realizing a gray scale display by liquid crystal deflection. In order to ensure normal image display, a first alignment layer 102 is disposed on a surface at a side of the array substrate 1 facing towards the liquid crystal layer 3, and a second alignment layer 202 is disposed on a surface at a side of the color filter substrate 2 facing towards the liquid crystal layer 3, and the first alignment layer 102 and the second alignment layer 202 are used to provide liquid crystal molecules with an initial deflection angle. At the same time, a surface at a side of the array substrate 1 facing away from the liquid crystal layer 3 is provided with a first polarizer 103, a surface at a side of the color filter substrate 2 facing away from the liquid crystal layer 3 is provided with a second polarizer 203, and the first polarizer 103 and the second polarizer 203 are used to select linearly polarized light to pass through. The fabricating process thereof is as follows: fabricating an array substrate including a first alignment layer and a color filter substrate including a second alignment layer respectively, and then, celling the array substrate and the color filter substrate to form into a liquid crystal cell, after that, attaching a first polarizer and a second polarizer respectively on the outer side of the liquid crystal cell.

It is found that the liquid crystal display panel fabricated by the existing process has the problems of dark light leakage, low light transmission efficiency, and low contrast ratio, and is not suitable for lightening and thinning of the product. This is caused by the inconsistency between the transmission axis direction of the polarizer and the alignment direction of the alignment layer. Since the alignment layer and the polarizer of the existing liquid crystal display panel are formed in different processes, the fabricating method not only easily causes inconsistency between the transmission axis direction of the polarizer and the alignment direction of the alignment layer, but also causes the problems, such as complicated structure of the liquid crystal display panel, large product thickness, and high production cost. The specific descriptions thereof are as follows.

Figure 2A:
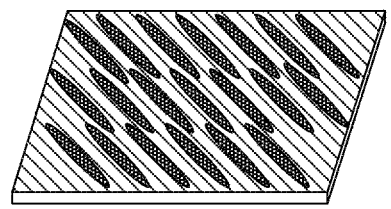
FIG. 2A is a schematic view showing a surface state of the alignment layer and the liquid crystal arrangement (or alignment) of the surface layer.
Figure 2B:
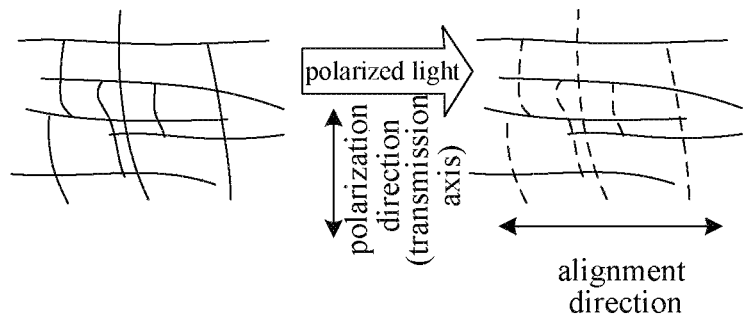
FIG. 2B is a schematic view showing the alignment principle of a photodegradable type alignment film.
Figure 2C:
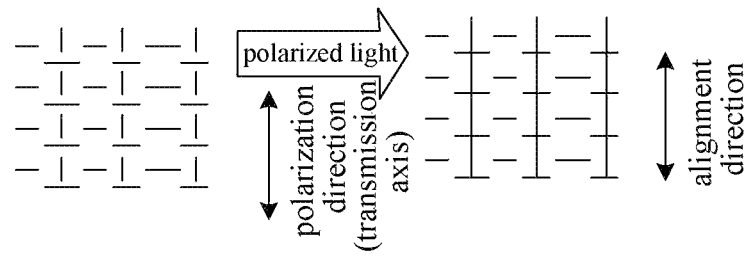
FIG. 2C is a schematic view showing the alignment principle of a photopolymerizable type alignment film.

In the liquid crystal display panel, inner sides of the array substrate and the color filter substrate need to be respectively provided with an alignment layer (i.e., polyimide (PI) layer), and the alignment layer needs to be subjected to alignment processing so that liquid crystal molecules have an initial deflection angle. The conventional alignment technology is mainly a contact rubbing alignment manner. The rubbing forms a shear stress to directionally arrange molecular chains on the surface of the alignment film, and to form an arrangement of fine grooves on the surface of the alignment film. The liquid crystal molecules are arranged along molecular chains on the surface of the alignment film and the grooves, and the liquid crystal molecules away from the alignment film are also controlled to be arranged in the same direction by the intermolecular force such as van der Waals force. FIG. 2A is a schematic view showing a surface state of the alignment layer and the liquid crystal arrangement (or alignment) of the surface layer. Since the rubbing alignment manner easily leads to problems such as dust particles, static electricity residues, brush marks, and uneven rubbing, a non-contact optical alignment (OA) manner has been developed. The optical alignment technology mainly utilizes the photochemical reaction of linear ultraviolet photosensitive materials to generate anisotropy, and there are mainly two kinds of alignment materials for optical alignment: one is a photodegradable type alignment material, and the other is a photopolymerizable type alignment material. With respect to the photodegradable type alignment material, a polyimide structure is commonly used. FIG. 2B is a schematic view showing the alignment principle of a photodegradable type alignment film. When the photodegradable type alignment material is irradiated by polarized light, the molecular chain parallel to the polarization direction of the polarized light is broken, and only the long-chain structure perpendicular to the polarization direction is retained, thus achieving vertical alignment. With respect to a photopolymerizable type alignment material, a photodimerization reaction is carried out by using an unsaturated bond. FIG. 2C is a schematic view showing the alignment principle of a photopolymerizable type alignment film. When the photopolymerizable type alignment material is irradiated by polarized light, molecules parallel to the polarization direction of the polarized light are polymerized to form a long-chain, thereby achieving parallel alignment. Since the optical alignment technology is a non-contact process, it has many advantages such as no damage to the film surface, no dust, less static electricity, alignment at the bend, uniform alignment, and the like, and is widely used. However, whether the rubbing alignment manner or the optical alignment manner is used, since alignment processing of the alignment layer is performed before celling, attaching of the polarizer is performed after celling, and since there is no direct alignment process between the alignment layer and the polarizer, a certain offset between the transmission axis direction of the polarizer and the alignment direction of the alignment layer easily occurs, thereby causing problems such as dark light leakage, low light transmission efficiency, and low contrast ratio.

Figure 3A:
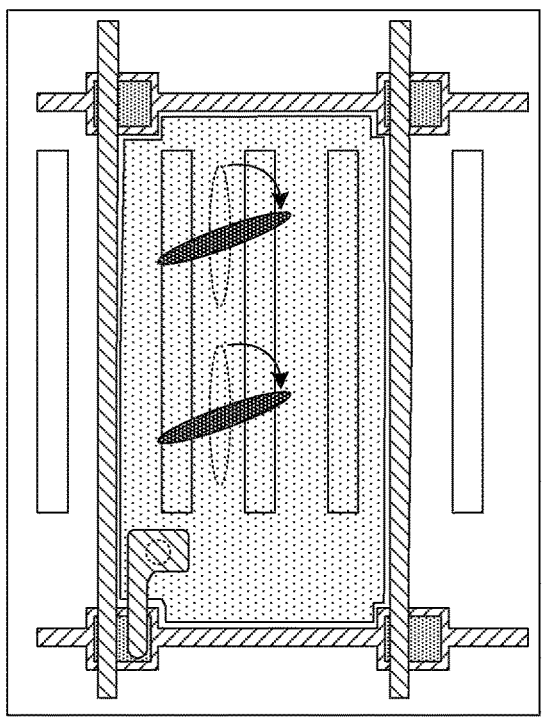
FIG. 3A is a schematic view of a conventional single domain pixel structure.
Figure 3B:
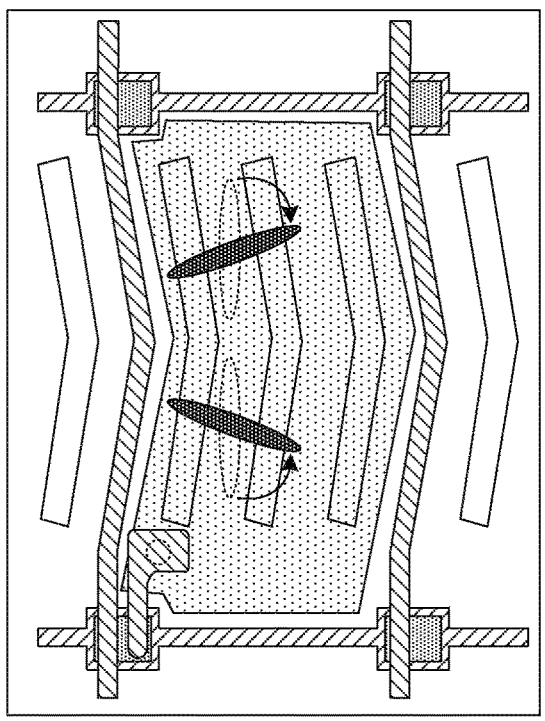
FIG. 3B is a schematic structural view of a conventional two domain pixel.

In addition, since the existing alignment device can only perform an alignment processing on the substrate in one direction, the existing alignment method may also lead to problems such as complicated substrate design and increased dark areas. Specifically, with respect to an array substrate of a Two Domain or Multi Domain pixel structure, since the existing alignment method cannot achieve alignment in different directions in the same pixel or in adjacent pixels, only slits of the pixel electrode can only be designed to symmetrically extend in different directions. In order to adapt to the extending direction of the slit, the data line needs to be designed in a corner shape. The liquid crystal molecules are formed as an elliptical or rod-like structure, different electron densities in the direction of the long and short axes lead to birefringence, and there is a difference between an optical path of light emitted in the direction parallel to the long axis and an optical path of light emitted in the direction parallel to the short axis, thereby generating color deviation and gray scale inversion. FIG. 3A is a schematic view of a conventional single domain pixel structure in which a broken line shows an initial alignment direction of liquid crystal molecules, and an arrow shows a deflection direction of liquid crystal molecules. As shown in FIG. 3A, for a single alignment direction and a single electric field direction, since the single domain structure has a single liquid crystal deflection direction, the human eyes see different gray scales or colors from the upper and lower viewing angles and the left and right viewing angles. In order to overcome the problem of color deviation and gray scale inversion, the related art proposes a two domain pixel structure and a multi domain pixel structure. FIG. 3B is a schematic view showing a conventional two domain pixel structure in which a broken line shows an initial alignment direction of liquid crystal molecules, and an arrow shows a deflection direction of liquid crystal molecules. As shown in FIG. 3B, for a single alignment direction and two electric field directions, liquid crystal molecules are deflected up and down and symmetrical with respect to left and right, achieving complementation of the upper and lower deflections and the left and right deflections to eliminate the difference in gray scales or colors between the upper and lower viewing angles and the left and right viewing angles. In order to achieve two electric field directions, slits of the pixel electrode are designed to extend symmetrically in different directions. Compared to linear data lines, corner-shaped data lines not only increase the resistive capacitance load, but also increase design complexity and display dark areas.

At the same time, since the existing alignment device can only perform alignment processing on the substrate in one direction, the existing alignment method has problems such as high production cost. Specifically, Multi-Model Glass (MMG) technology as a solution for improving the utilization ratio of an underlayer substrate (also referred to as a glass base) is to arrange different types of products on the same glass base, so that the remaining blank areas when only the same type of products are arranged would be fully utilized, and the waste of raw materials is reduced. However, since the existing alignment device can only perform the alignment processing on the substrate in one direction, the application range of the MMG technology is limited, causing a large area waste and increasing the production cost.

Figure 4A:
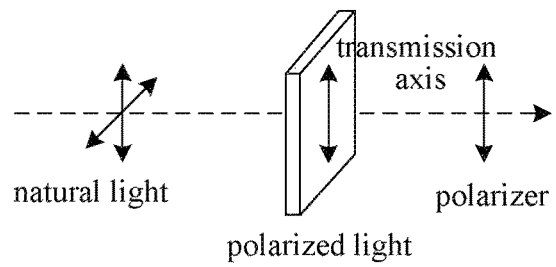
FIG. 4A is a schematic view showing the working principle of the polarizer.
Figure 4B:
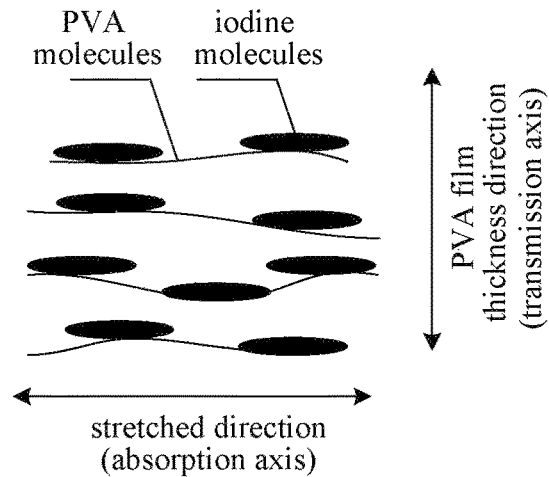
FIG. 4B is a schematic view showing the principle of a conventional I-PVA type polarizer.

FIG. 4A is a schematic view showing the working principle of the polarizer. As shown in FIG. 4A, the working principle is performed only in such a way that light parallel to the transmission axis (polarization axis) direction absorbs light perpendicular to the transmission axis (absorption axis) direction and natural light is converted into linearly polarized light. In the liquid crystal display panel, polarizers are disposed in pairs on both sides of the liquid crystal cell, and transmission axes of two polarizers are perpendicular to each other. Presently, the polarizer commonly used in the liquid crystal display panel mainly is a polymer iodine polyvinyl alcohol (I-PVA) type. FIG. 4B is a schematic view showing the principle of an I-PVA type polarizer. As shown in FIG. 4B, the I-PVA polarization effect is derived from the birefringence caused by the asymmetry of the microstructure. Specifically, iodine molecules attached to the stretched PVA molecules and the PVA molecules are arranged in the same direction, and the elongated iodine molecules absorb light that vibrates parallel to the long axis of the iodine molecule and transmits light that vibrates perpendicular to the long axis of the iodine molecule. When a polarizer is used, in order to maintain the iodine molecule in the PVA stretched while protecting it from the external environment, two transparent cellulose triacetate (TAC) sheets are attached to upper and lower surfaces of the PVA layer. Since the polarizer needs to be attached onto the array substrate and the color filter substrate, one side of the TAC is coated with an adhesive layer made of acrylic material, and the adhesive layer is attached with a protective film made of polyethylene terephthalate (PET), and the polarizer is attached onto the substrate and then peeled off. Since the entire polarizer is thick (hundreds of micrometers), the overall thickness of the liquid crystal display panel is large, which is disadvantageous for the display panel to be thin and light. In addition, the polarizer is easily scratched when used, and is easily warped during the aging test, resulting in poor visual experience and abnormal display.

In order to solve the problem that the liquid crystal display panel fabricated by the exiting process has dark light leakage, low light transmission efficiency, and low contrast ratio, an embodiment of the present disclosure provides a display substrate. The main structure of the display substrate of the embodiment of the present disclosure includes a base, a display structure layer disposed on the base, and an alignment layer. A grating polarizing layer is disposed in the display structure layer, and an optical alignment direction of the alignment layer is parallel to or perpendicular to a transmission axis direction of the grating polarizing layer.

The technical solutions of the embodiments of the present disclosure are described in detail below through specific embodiments.

Figure 5:
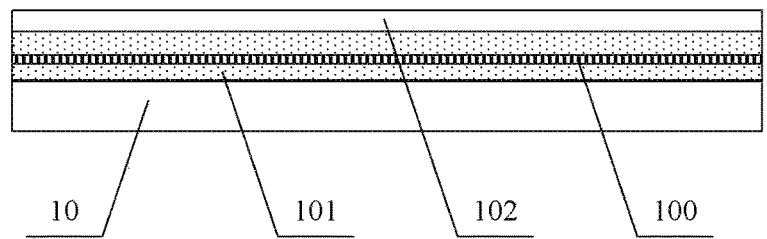
FIG. 5 is a schematic structural view of an array substrate according to an embodiment of the present disclosure.

In an embodiment of the present disclosure, the display substrate is an array substrate. FIG. 5 is a schematic structural view of an array substrate according to an embodiment of the present disclosure. As shown in FIG. 5, the array substrate of the present embodiment includes a first base 10, an array structure layer 101 disposed on the first base 10, and a first alignment layer 102 located on a surface at a side of the array structure layer 101 away from the first base 10, i.e., the array structure layer 101 and the first alignment layer 102 are stacked on the first base 10. The array structure layer 101 is provided with a first grating polarizing layer 100 for realizing a polarizing function during display and also optically aligning the first alignment layer 102 by the transmitted polarized light during the alignment processing, so that the optical alignment direction of the first alignment layer 102 is parallel to or perpendicular to the transmission axis direction of the first grating polarizing layer 100.

The array structure layer 101 includes grating lines, data lines, thin film transistors, pixel electrodes, common electrodes and the like for forming an electric field to drive liquid crystal molecules to be deflected. The first alignment layer 102 is an optical alignment layer to enable liquid crystal molecules to have an initial deflection angle. The first grating polarizing layer 100 includes a plurality of grating strips disposed in parallel and periodically arranged, is disposed in an effective display area (sub-pixel opening area) in each sub-pixel, and has two functions, one of which is to realize polarizing function during display so as to act as a polarizer through which linearly polarized light passes, and the other of which is to optically align the first alignment layer 102 by the transmitted polarized light when the first alignment layer 102 is optically aligned, so that the optical alignment direction of the first alignment layer 102 is parallel to or perpendicular to the transmission axis direction of the first grating polarizing layer 100. In actual implementation, the first alignment layer 102 may also be located on a surface at a side of the first base 10 away from the array structure layer 101.

Figure 6:
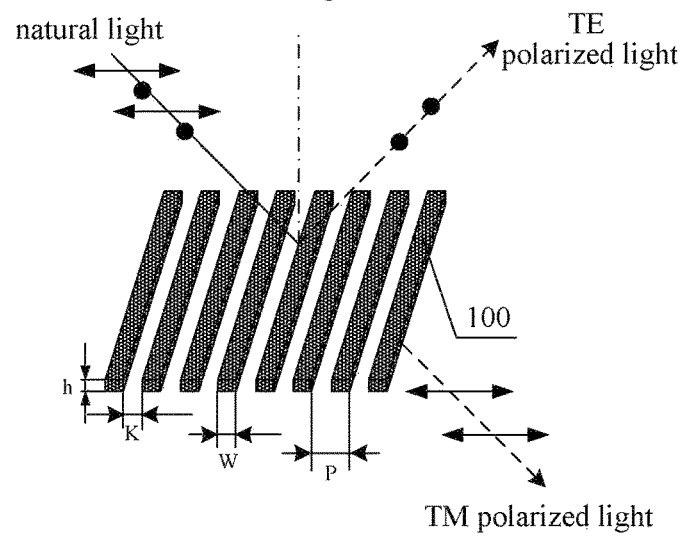
FIG. 6 is a schematic view of the polarization principle of a first grating polarizing layer according to an embodiment of the present disclosure.

FIG. 6 is a schematic view of the polarization principle of a first grating polarizing layer according to an embodiment of the present disclosure. As shown in FIG. 6, the first grating polarizing layer 100 includes a plurality of grating strips disposed in parallel and periodically arranged. The basic principle of the first grating polarizing layer is to achieve good polarization characteristics by utilizing the geometric asymmetry of the grating structure. Specifically, natural light includes two orthogonal polarized lights, i.e., TE polarized light parallel to the direction of grating strips and TM polarized light perpendicular to the direction of grating strips. The boundary conditions of two orthogonal polarized lights are different, and thus the equivalent refractive indices of two orthogonal polarized lights are different. Since the grating polarizing layer is formed by a set of grating strips with pitches close to or smaller than the incident wavelength, the light parallel to the direction of grating strips is absorbed or reflected, and the light perpendicular to the direction of grating strips may be freely transmitted, i.e., TE polarized light is absorbed or reflected, and TM polarized light is transmitted. In an embodiment of the present disclosure, a grating period P of the first grating polarizing layer is smaller than a given electromagnetic wave wavelength, and a duty ratio is 0.3 to 0.7. The given electromagnetic wave wavelength is determined according to the wavelength required by optical alignment of the first alignment layer material. The wavelength of the ultraviolet light used for the optical alignment is smaller than the visible light wavelength, and the grating period smaller than the ultraviolet light wavelength is also smaller than the visible light wavelength, so that the visible light is polarized during display. The grating period P refers to a sum of the width W of the grating strip and the gap K between grating strips in the direction in which the grating strips are arranged (perpendicular to the length direction of the grating strip), and the duty ratio refers to a ratio of the width W of the grating strip to the grating period P. Optionally, the grating period is set to be less than 400 nm and the duty ratio is 0.4 to 0.6. Further, optionally, the grating period is set to be 180 nm to 220 nm, and the duty ratio is 0.5. The material of the first grating polarizing layer may be a metal material or a non-metal material commonly used in the field of display technologies. The metal material includes aluminum (Al), silver (Ag), molybdenum (Mo), gold (Au), copper (Cu), chromium (Cr) or the like, and the non-metal material includes silicon nitride SiNx, silicon oxide SiOx, silicon oxynitride Si(ON)x, acryl resin, polyimide resin, black matrix material, or the like. A transparent conductive material such as indium tin oxide ITO or indium zinc oxide IZO may also be used. It should be noted that the foregoing is merely illustrative that is not limited thereto, and other materials may be used, which is not limited in this embodiment.

In this embodiment, the first grating polarizing layer may be separately disposed at any layer position of the array structure layer, or may be disposed in the same layer as a certain film layer of the array structure layer, or may be integrated with a certain film layer of the array structure layer. For example, the first grating polarizing layer may be separately disposed on the first base, or may be disposed in the same layer as the grating lines, or may disposed in the same layer as the data lines, or may be integrated with pixel electrodes to form an integrated structure, or may form an integral structure with common electrodes. It is also possible to dispose in the same layer as a metal layer such as a touch layer or other dielectric layers, or to form an integrated structure. In addition, the first grating polarizing layer may be fabricated by manners including, but not limited to, nanoimprinting, 3D printing, patterning, and the like.

In the first grating polarizing layer of the embodiment, the grating strips may be in a strip-shaped body combined structure, and the plurality of strip-shaped bodies are sequentially arranged to form grating strips disposed in parallel and periodically arranged. The slit structure may also be used in which a plurality of elongated strip grooves are formed on the plate body to form a plurality of grating strips disposed in parallel and periodically arranged. Further, the grating strip may have a linear shape and may extend in one direction, or may have a polygonal line shape and extend in two or more directions to meet the requirements of the two domain or multi domain pixel structure.

In this embodiment, during optical alignment of the first alignment layer, if the first alignment layer is made of a photodegradable type alignment material, the molecular chain parallel to the transmission axis direction of the first grating polarizing layer is broken and only the long-chain structure in the vertical direction is retained when the photodegradable type alignment material is irradiated by polarized light, so that the optical alignment direction of the first alignment layer is perpendicular to the transmission axis direction of the first grating polarizing layer; if the first alignment layer is made of a photopolymerizable type alignment material, molecules parallel to the transmission axis direction of the first grating polarizing layer are polymerized to form a long-chain when the photopolymerizable type alignment material is irradiated by polarized light, so that the optical alignment direction of the first alignment layer is parallel to the transmission axis direction of the first grating polarizing layer.

Figure 7:
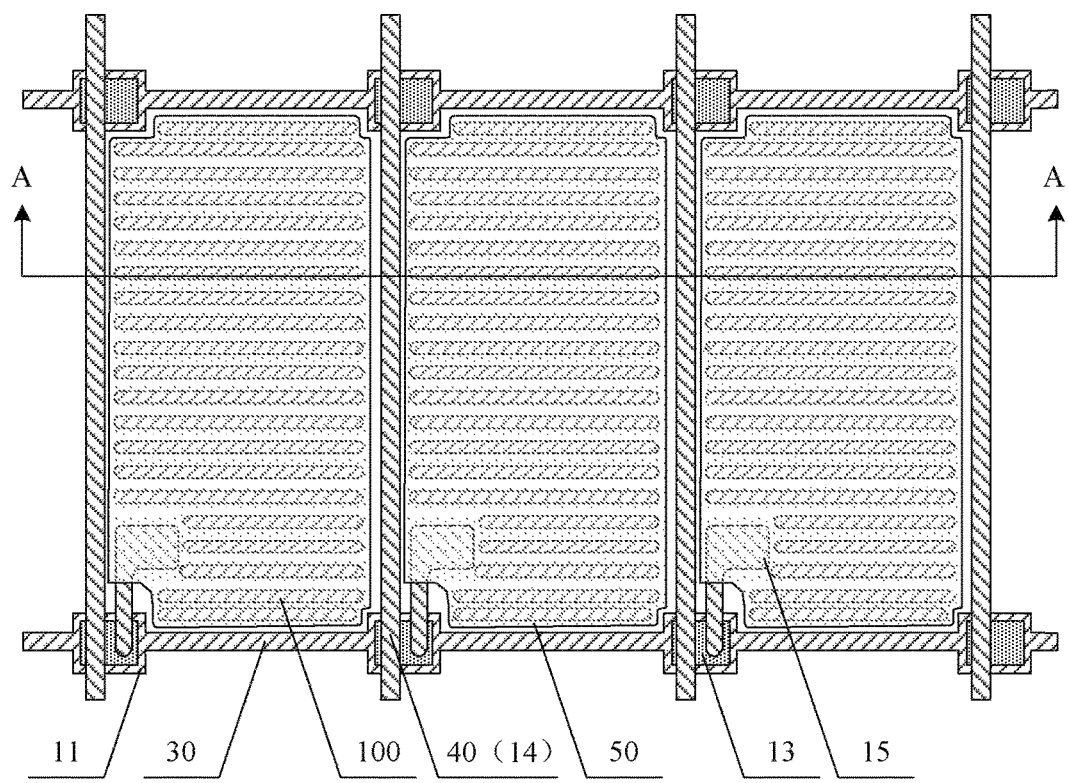
FIG. 7 is a schematic view of an implementation structure of an array substrate according to an embodiment of the present disclosure.
Figure 8:
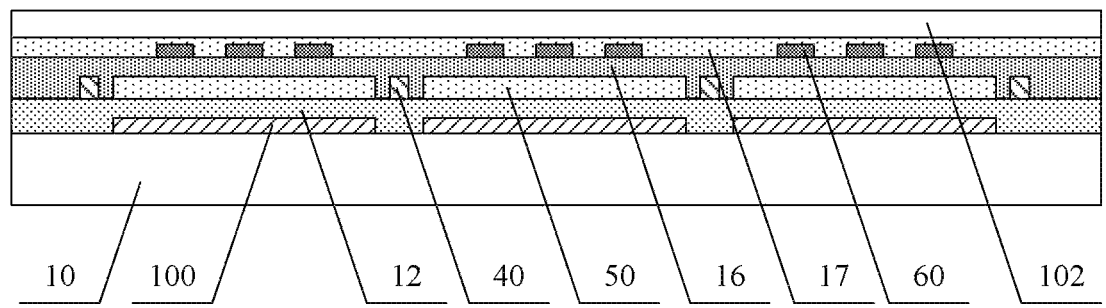
FIG. 8 is a cross-sectional view taken along line A-A of FIG. 7.

FIG. 7 is a schematic view showing an implementation structure of an array substrate according to an embodiment of the present disclosure, and FIG. 8 is a cross-sectional view taken along line A-A of FIG. 7 showing a structure of three sub-pixels of an Advanced Super Dimension Switch (ADS) display mode array substrate. As shown in FIGS. 7 and 8, the array substrate of the implementation structure includes:

a first base 10;

first grating polarizing layers 100, grating lines 30, and gate electrodes 11 disposed on the first base 10, the first grating polarizing layer 100 being located in an effective display area for performing a polarizing function during display and optically aligning the first alignment layer 102 by the transmitted polarized light during the alignment processing, so that the optical alignment direction of the first alignment layer 102 is parallel to or perpendicular to the transmission axis direction of the first grating polarizing layer 100;

a first insulating layer 12 covering the first grating polarizing layer 100, the grating line 30 and the gate electrode 11;

active layers 13, source electrodes 14, drain electrodes 15, data lines 40 and pixel electrodes 50 disposed on the first insulating layer 12, a conductive channel being formed between the source electrode 14 and the drain electrode 15, and the pixel electrode 50 being located in an effective display area and connected to the drain electrode 15; a second insulating layer 16 covering the pixel electrode 50;

common electrodes 60 disposed on the second insulating layer 16;

a third insulating layer 17 covering the common electrode 60; and the first alignment layer 102 disposed on the third insulating layer 17.

In this implementation structure, the pixel electrode is a plate-shaped electrode for providing a pixel voltage for display, the common electrode is a slit electrode for providing a common voltage, and a multi-dimensional electric field generated between the slit electrode and the plate-shaped electrode drives the liquid crystal deflection. The first grating polarizing layer 100 is disposed in the same layer as grating lines 30 and gate electrodes 11, and is formed by one patterning process, and is located in an effective display area of each sub-pixel. The shape of the grating strip in the first grating polarizing layer 100 is a linear shape, and the grating strips in the first grating polarizing layer 100 are parallel to the grating lines 30. In actual implementation, an angle between the grating strip and the grating line may be set according to the alignment requirements, or the grating strip may be provided in a polygonal line shape according to requirements of the two domain or multi domain pixel structure to realize a two domain or multi domain pixel structure.

The technical solution of the embodiment is further described below by the fabricating process of the array substrate of the present implementation structure. The "patterning process" referred to in this embodiment includes processes such as, for example, depositing a film layer, coating a photoresist, performing mask exposure, development, etching, stripping photoresist, etc., which are mature fabricating processes in the related art. The deposition may be carried out by a known process such as sputtering, evaporation, chemical vapor deposition, or the like. The coating may be carried out by a known coating process, and the etching may be carried out by a known method, which are not specifically limited herein. In the description of the present embodiment, it should be understood that "thin film" refers to a thin film in which some material is formed on a substrate by depositing or other processes. If the "thin film" does not require a patterning process throughout the manufacturing process, the "thin film" may also be referred to as a "layer". If the "thin film" still needs a patterning process throughout the manufacturing process, it may be called "thin film" before the patterning process, and called "layer" after the patterning process. The "layer" after the patterning process contains at least one "pattern".

Figure 9:
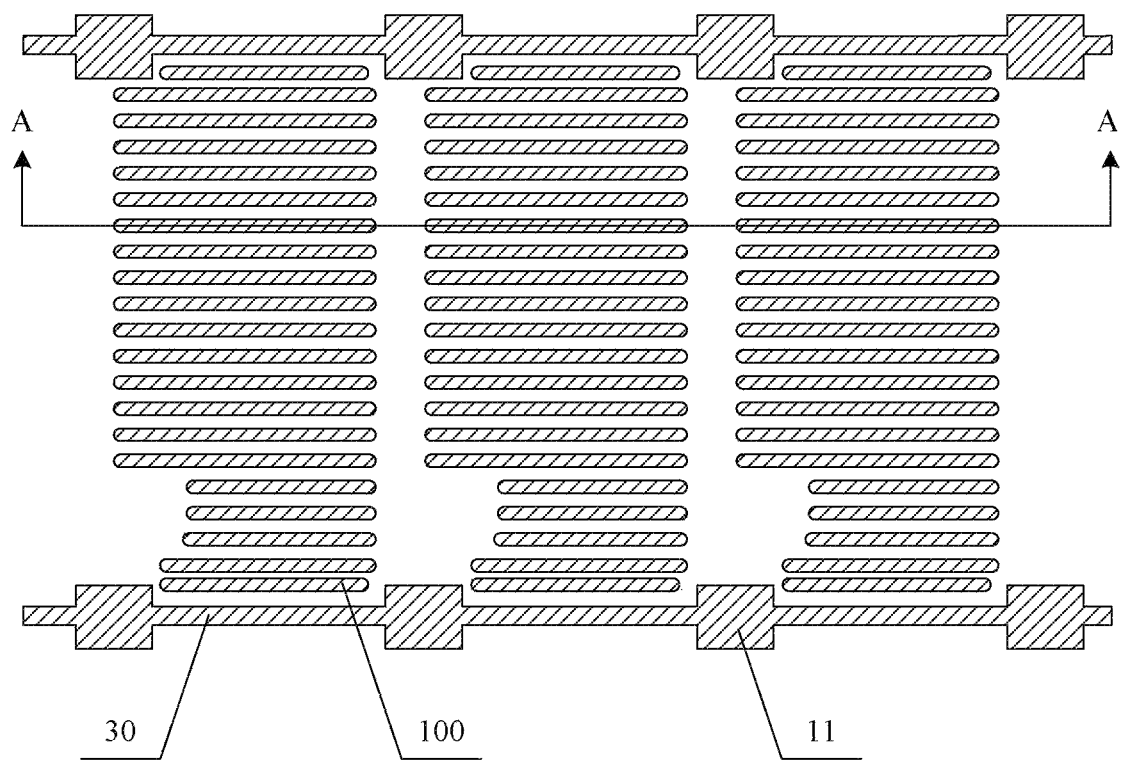
FIG. 9 is a schematic view after forming a pattern of first grating polarizing layers, grating lines, and gate electrodes according to an embodiment of the present disclosure.
Figure 10:
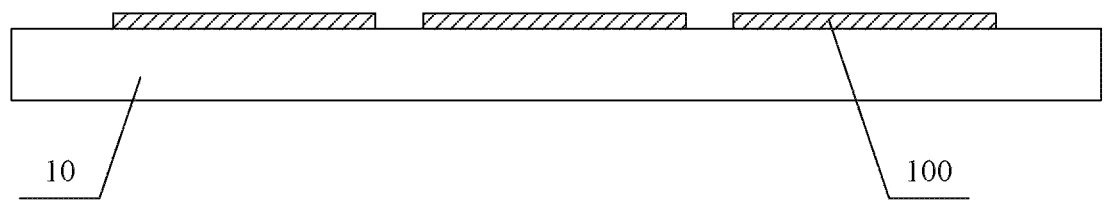
FIG. 10 is a cross-sectional view taken along line A-A of FIG. 9.

(1) Forming a pattern of first grating polarizing layers, grating lines, and gate electrodes on the first base. Forming a pattern of first grating polarizing layers, grating lines, and gate electrodes on the first base includes: depositing a first metal thin film on the first base, and coating a layer of photoresist on the first metal thin film, exposing and developing the photoresist by using a monotone mask, forming unexposed regions at a position of first grating polarizing layers, grating lines and gate electrodes in which the photoresist is retained, and/or forming a fully exposed region at other positions in which there is no photoresist. The first metal thin film in the fully exposed region is etched by an etching process, and the remaining photoresist is peeled off. The pattern of first grating polarizing layers 100, grating lines 30, and gate electrodes 11 is formed on the first base 10. The first grating polarizing layer 100 is located in the effective display area of each sub-pixel, and includes a plurality of grating strips disposed in parallel and periodically arranged, as shown in FIGS. 9 and 10, and FIG. 10 is a cross-sectional view taken along line A-A of FIG. 9. The first grating polarizing layer, the grating line and the gate electrode may be made of aluminum (Al), silver (Ag), molybdenum (Mo), gold (Au), copper (Cu), chromium (Cr), or the like. It should be noted that the foregoing is merely illustrative that is not limited thereto, and other materials may be used, which is not limited in this embodiment.

Figure 11:
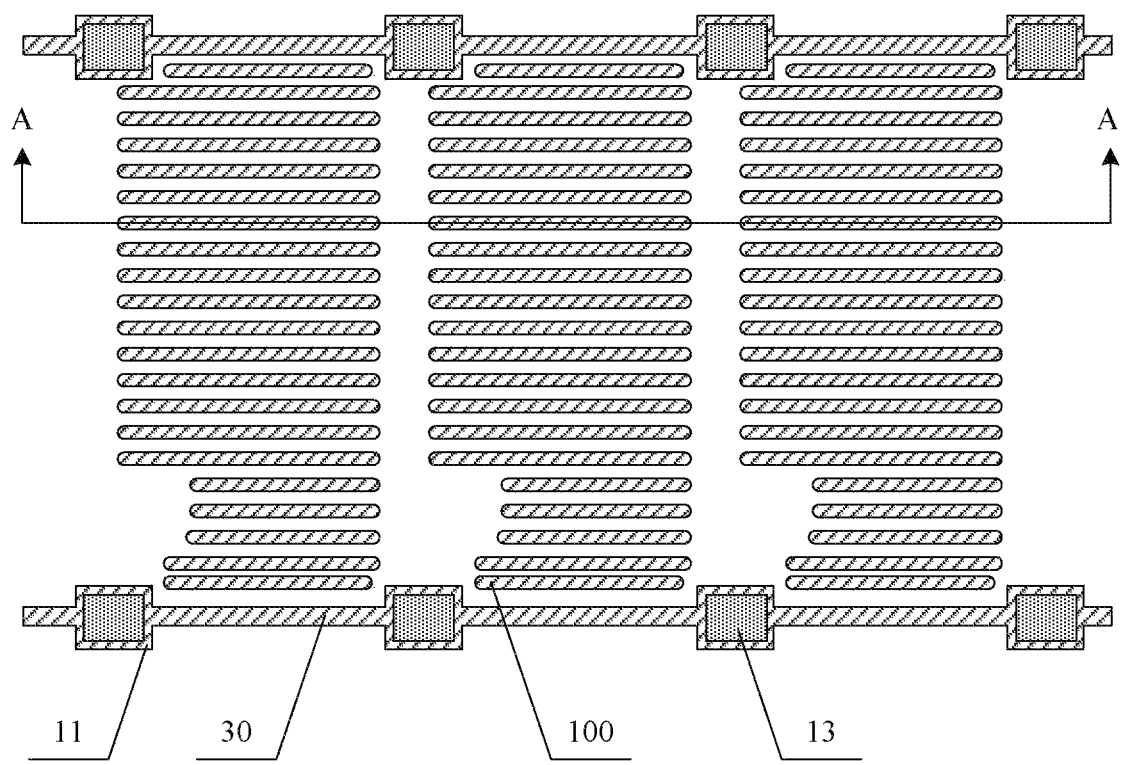
FIG. 11 is a schematic view after forming a pattern of active layers according to an embodiment of the present disclosure.
Figure 12:
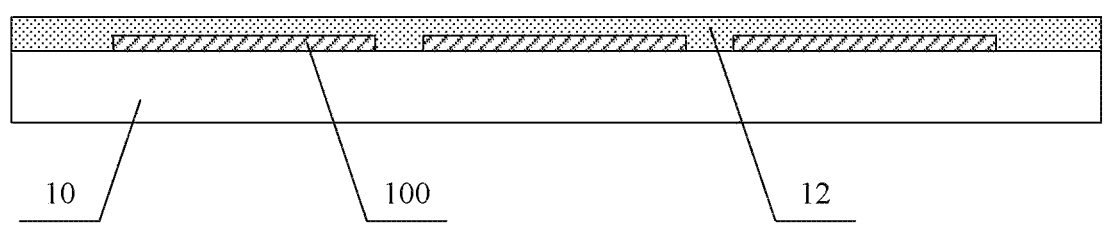
FIG. 12 is a cross-sectional view taken along line A-A of FIG. 11.

(2) Forming a pattern of active layers. Forming a pattern of active layers includes: sequentially depositing a first insulating thin film and a semiconductor thin film on the first base on which the foregoing pattern is formed, patterning the semiconductor thin film by a patterning process, and forming a pattern of a first insulating layer 12 and an active layer 13 on the first base 10, wherein the first insulating layer 12 covers a pattern of first grating polarizing layers 100, grating lines 30 and gate electrodes 11, and the active layer 13 is disposed on the first insulating layer 12 at the position of the gate electrode 11, as shown in FIGS. 11 and 12, where FIG. 12 is a cross-sectional view taken along line A-A of FIG. 11. Generally, the first insulating layer 12 is also referred to as a gate insulating layer (GI).

Figure 14:
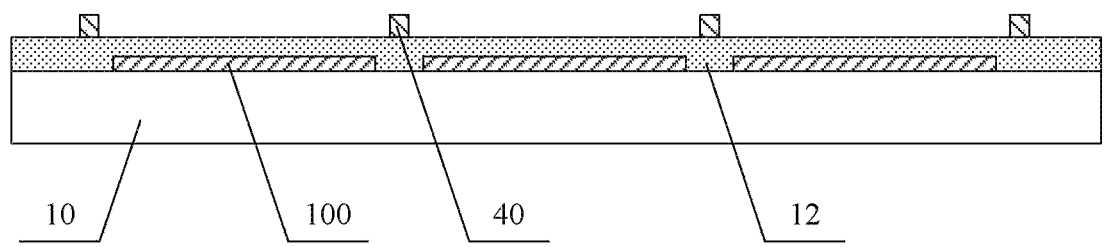
FIG. 14 is a cross-sectional view taken along line A-A of FIG. 13.
Figure 13:
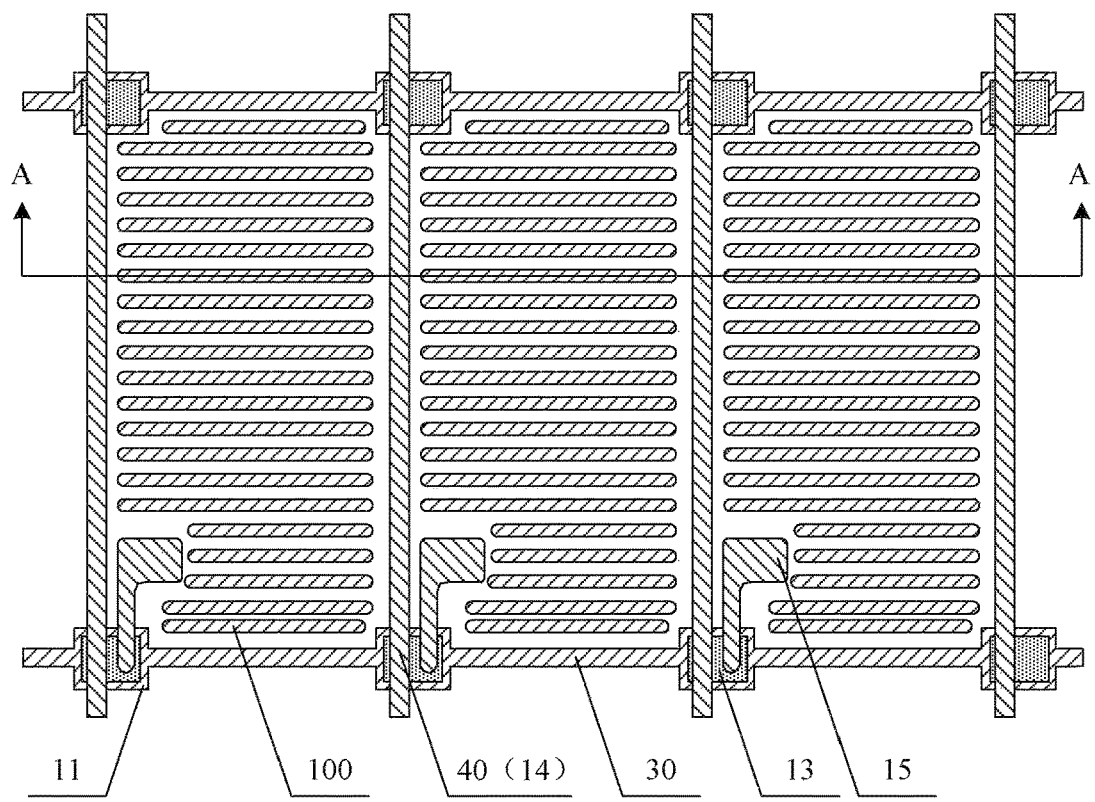
FIG. 13 is a schematic view after forming a pattern of source electrodes, drain electrodes and data lines according to an embodiment of the present disclosure.

(3) Forming a pattern of source electrodes, drain electrodes, and data lines. Forming a pattern of source electrodes, drain electrodes, and data lines includes: depositing a second metal thin film on the first base on which the foregoing pattern is formed, patterning the second metal thin film by a patterning process, and forming a pattern of source electrodes 14, drain electrodes 15 and data lines 40 on the first base 10, wherein the data line 40 is perpendicular to the grating line 30, grating lines 30 and data lines 40 define a plurality of sub-pixels, and the data line 40 and the source electrode 14 are integrated, and a conductive channel is formed between the source electrode 14 and the drain electrode 15, as shown in FIGS. 13 and 14, where FIG. 14 is a cross-sectional view taken along line A-A of FIG. 13. The source electrode and the drain electrode in the embodiments of the present application are sometimes referred to as a drain electrode and a source electrode.

Figure 15:
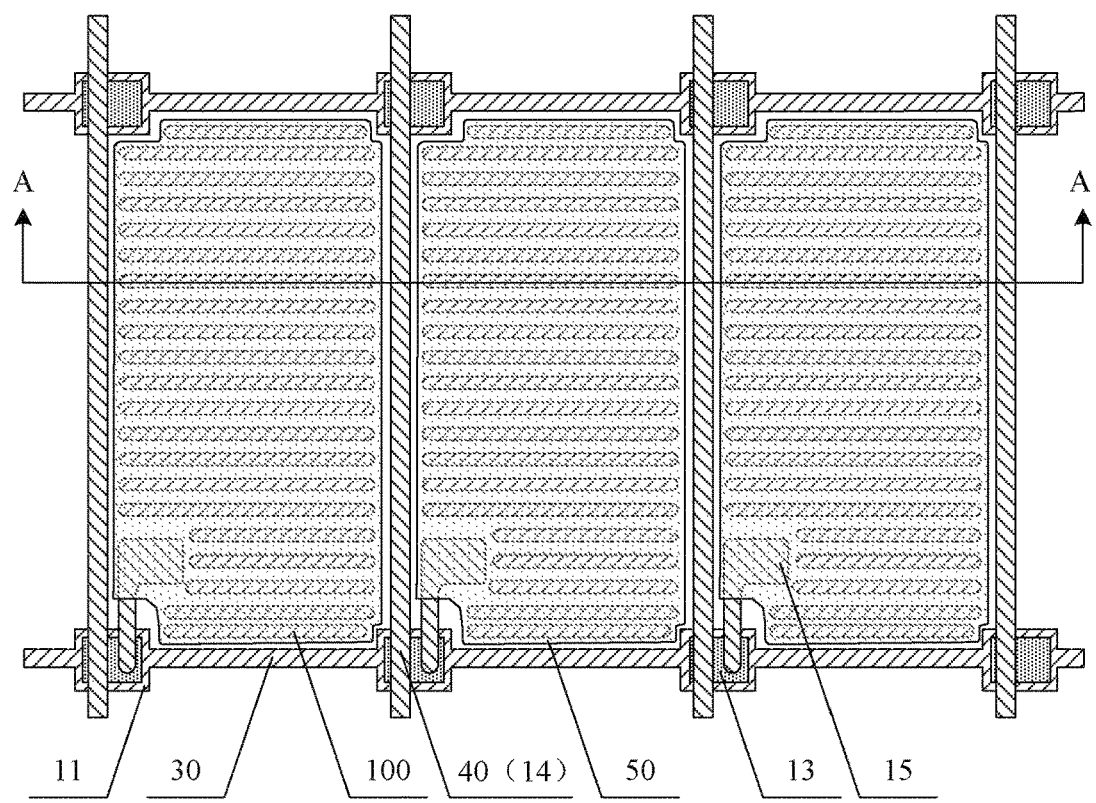
FIG. 15 is a schematic view after forming a pattern of pixel electrodes according to an embodiment of the present disclosure.
Figure 16:
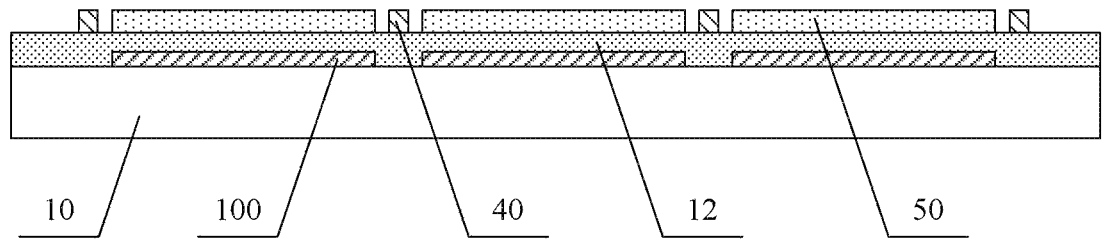
FIG. 16 is a cross-sectional view taken along line A-A of FIG. 15.

(4) Forming a pattern of pixel electrodes. Forming a pattern of pixel electrodes includes: depositing a first transparent conductive thin film on the first base on which the foregoing pattern is formed, patterning the first transparent conductive thin film by a patterning process, and forming a pattern of pixel electrodes 50 on the first base 10, wherein the pixel electrode 50 is a plate-shaped electrode located in the effective display area of each sub-pixel, and is connected to the drain electrode 15, as shown in FIGS. 15 and 16, where FIG. 16 is a cross-sectional view taken along line A-A of FIG. 15.

Figure 17:
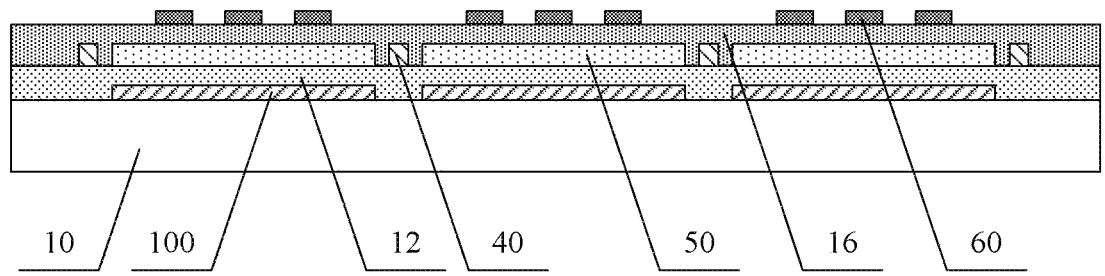
FIG. 17 is a schematic view after forming a pattern of common electrodes according to an embodiment of the present disclosure.

(5) Forming a pattern of common electrodes. Forming a pattern of common electrodes includes: sequentially depositing a second insulating thin film and a second transparent conductive thin film on the first base on which the foregoing pattern is formed, patterning the second transparent conductive thin film by a patterning process, and forming a pattern of a second insulating layer 16 and common electrodes 60 on the first base 10, wherein the second insulating layer 16 covers a pattern of source electrodes 14, drain electrodes 15, data lines 40, and pixel electrode 50, the common electrode 60 is disposed on the second insulating layer 16, and the common electrode 60 is a slit electrode as shown in FIG. 17. Generally, the second insulating layer is also referred to as a passivation layer (PVX).

Subsequently, a third insulating layer 17 is formed on the first base on which the foregoing pattern is formed, and the third insulating layer 17 is also referred to as an over coating (OC). An alignment liquid is coated on the third insulating layer 17, which is irradiated by using ultraviolet light from the bottom surface of the first base 10 (the surface of the base 10 away from the respective structure layer) after sequentially performing the conventional Pre Cure/Main Cure, and, finally, a conventional postbake process is performed to form a first alignment layer 102 on the first base 10. Since the array substrate of the embodiment is provided with the first grating polarizing layer 100, that absorbs or reflects the TE polarized light and transmits the TM polarized light, the transmitted TM polarized light optically aligns the first alignment layer such that the optical alignment direction of the first alignment layer 102 is parallel to or perpendicular to the transmission axis direction of the first grating polarizing layer 100. If the first alignment layer is made of a photodegradable type alignment material, the molecular chain parallel to the transmission axis direction of the first grating polarizing layer is broken and only the long-chain structure in the vertical direction is retained when the photodegradable type alignment material is irradiated by polarized light, so that the optical alignment direction of the first alignment layer is perpendicular to the transmission axis direction of the first grating polarizing layer. If the first alignment layer is made of a photopolymerizable type alignment material, molecules parallel to the transmission axis direction of the first grating polarizing layer are polymerized to form a long-chain when the photopolymerizable type alignment material is irradiated by polarized light, so that the optical alignment direction of the first alignment layer is parallel to the transmission axis direction of the first grating polarizing layer. Unlike the related art, the ultraviolet light source used in the present embodiment is non-polarized ultraviolet light, and the related art generally uses polarized light for irradiation.

It can be seen from the fabricating process of the array substrate of the present implementation structure that, as the first grating polarizing layer is disposed in the array substrate in the present implementation structure, the first grating polarizing layer is not only used for the polarizing function during display and the optical alignment of the first alignment layer by the transmitted polarized light during the alignment processing, so that the optical alignment direction of the first alignment layer is parallel to or perpendicular to the transmission axis direction of the first grating polarizing layer. That is, the present implementation structure realizes the self-alignment between the alignment layer and the polarizer, completely eliminates the deviation of the transmission axis direction of the polarizer and the alignment direction of the alignment layer which are prone to the existing structure, solves the problems of dark state light leakage, low light transmission efficiency and low contrast ratio in the existing structure, and improves light transmission efficiency and contrast ratio.

In the meantime, in the implementation structure, the array structure of the two domain or multi domain pixel structure can be realized by performing alignment processing on the array substrate in multiple directions. With respect to the array substrate that realizes a two domain or multi domain pixel structure, it is only necessary to design the shape and orientation of the grating strip in the first grating polarizing layer according to the alignment direction, such as a polygonal line shape grating strip. Different grating directions are formed in the same sub-pixel or in adjacent sub-pixels according to domains, and the first alignment layer in the same sub-pixel or in adjacent sub-pixels may have alignments in different directions by ultraviolet light irradiation, thereby realizing formation of two domain or multi domain pixel structure in one pixel or adjacent pixels, and avoiding the data line corner structure caused by slits. The design of the pixel structure is more compact, which reduces the trace length and the resistive capacitance load, and reduces the display dark areas.

Figure 18:
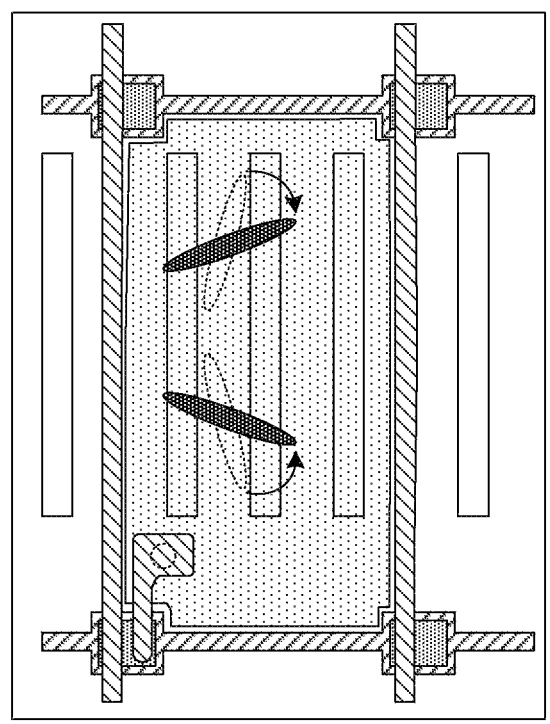
FIG. 18 is a schematic view of forming a two domain pixel structure according to an embodiment of the present disclosure.

FIG. 18 is a schematic view of forming a two domain pixel structure according to an embodiment of the present disclosure, in which a broken line shows an initial alignment direction of liquid crystal molecules, and an arrow shows a deflection direction of liquid crystal molecules. As shown in FIG. 18, in one pixel, the first alignment layer of the present embodiment has two symmetrical alignment directions, and when a single electric field direction is applied, liquid crystal molecules are vertically symmetrically deflected to eliminate the difference in viewing angles. Generally, the deflection angle of liquid crystal molecules, under a specific electric field, is mainly a result of balance between a rotational power F1 (the electric field force between the pixel electrode and the common electrode) and a suppression resistance F2 (the internal viscoelastic force of liquid crystal molecules, the anchoring force of the external alignment film) to which the liquid crystal molecules are subjected. Comparing FIG. 3B and FIG. 18, it can be seen that the related art realizes that the two domain pixel structure adopts a single alignment direction and two electric field directions, wherein, in one pixel, the electric field force F1 between the pixel electrode and the common electrode presents two symmetrical directions, so that liquid crystal molecules are symmetrically deflected. In the related art, this implementation requires the pixel electrode to be bent, resulting in a display dark area at the edge and the combination portion in which multi-electric field is unstable, and requires the data line to be designed in a corner shape, which not only increases the resistive capacitance load, but increases the design complexity. In contrast, this embodiment uses two alignment directions and a single electric field direction, wherein the anchoring force F2 of the external alignment film is set to extend in two symmetrical directions, and the electric field force F1 extends only in a single direction, so that the realized two domain pixel structure simplifies the design of the pixel electrode, increasing freedom of product design, and avoiding generation of liquid crystal dark areas.

In addition, the implementation structure facilitates the implementation of the MMG technology. Since the polarization grating is formed inside the array substrate and corresponds to the product one by one, it would not be affected by the arrangement direction. Different products may form corresponding alignment directions by ultraviolet light irradiation, thereby realizing alignment processing in multiple directions on a plurality of different types of products arranged on the glass base, which breaks through the limitation that the existing MMG technology can only carry products with the same alignment direction, so that the blank area of the glass base can be fully utilized, the waste of raw materials is greatly reduced, and the production cost is reduced.

Also, in the implementation structure, first grating polarizing layers are integrated in the array substrate, and a first grating polarizing layer can realize a function of selecting linear polarized light to pass through, and the polarizer embedded in the array substrate is used to replace the external polarizer of the existing structure. After the array substrate and the color filter substrate are celled, the outer side of the array substrate does not need to be attached to the polarizer, and the structure such as the TAC sheet and the adhesive layer for ensuring the normal operation of the polarizer is also not required, which not only effectively reduces the overall thickness of the display panel to realize lightening and thinning of the display panel, but eliminates the complicated attaching operation, simplifies the fabricating equipment and process, reduces the production cost, avoids the problem of polarizer warpage in the reliability test of the product, and eliminates the poor visual experience and abnormal display caused by scratch and aging of the polarizer.

Further, the number of patterning times of the array substrate fabricated by the implementation structure is the same as that of the existing fabricating method, and the process flow is the same as the existing fabricating process. Therefore, it is not necessary for the implementation of the embodiment to change the existing process flow and the existing process equipment, and the present embodiment has good process compatibility, strong practicability. and good application prospects.

Although the first grating polarizing layer is fabricated by a patterning process as an example to illustrate the technical solution of the embodiment, in actual implementation, the first grating polarizing layer of the embodiment may also be fabricated by other methods, such as printing, 3D printing, or laser scanning, etc. In actual implementation, the number of patterning processes described above may also be adjusted according to actual needs. For example, the patterning process of forming a pattern of first grating polarizing layers, grating lines and gate electrodes may be completed by two patterning processes, i.e., first forming a pattern of grating lines and gate electrodes by one patterning process, and then forming the first grating polarizing layer by another patterning process, or first forming the first grating polarizing layer by one patterning process and then forming a pattern of grating lines and gate electrodes by another patterning process. Thus, the first grating polarizing layer and the grating line may be made of different materials and/or may be fabricated by different processes. As another example, two patterning processes of forming a pattern of the active layer and forming a pattern of source electrodes, drain electrodes, and data lines may also be combined into one patterning process using a gray tone mask. In addition, the array substrate may also include other film layers, such as common electrode leads, which can be known by those skilled in the art according to common knowledge and related art, and will not be specifically limited herein.

Figure 19:
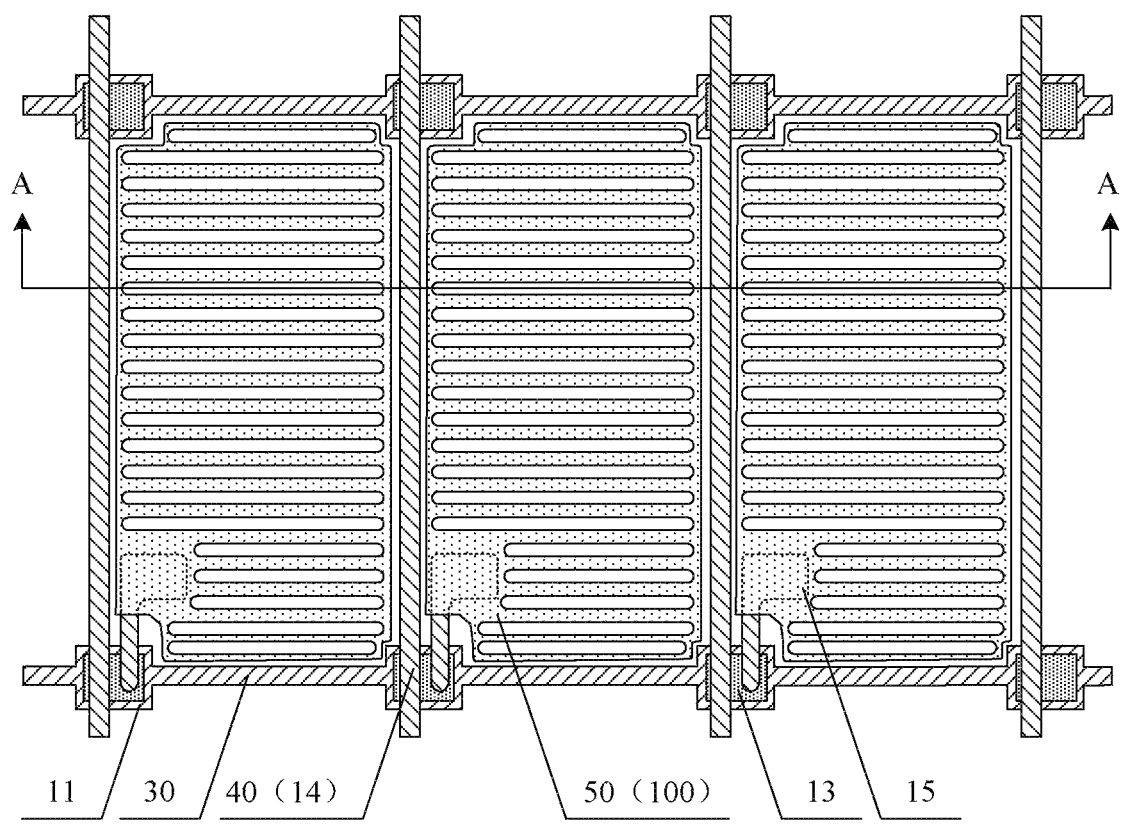
FIG. 19 is a schematic view of another implementation structure of an array substrate according to an embodiment of the present disclosure.
Figure 20:
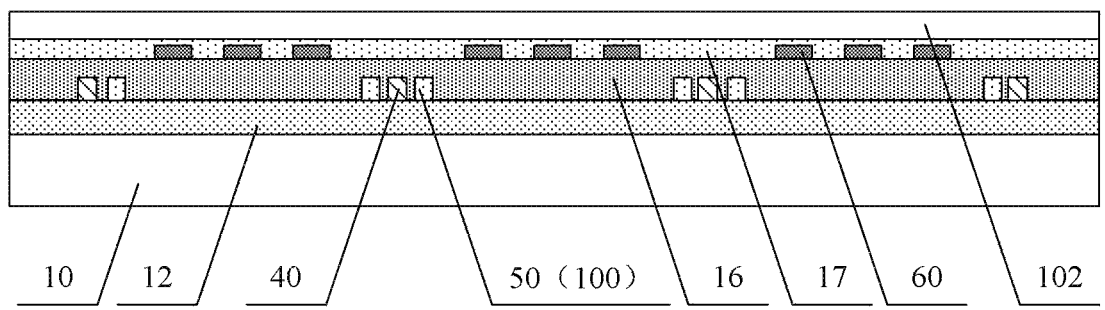
FIG. 20 is a cross-sectional view taken along line A-A of FIG. 19.

FIG. 19 is a schematic view showing another implementation structure of an array substrate according to an embodiment of the present disclosure, and FIG. 20 is a cross-sectional view taken along line A-A of FIG. 19. The present implementation structure is a variation of the foregoing implementation structure, and the main structure is the same as the foregoing implementation structure. Unlike the foregoing implementation structure, the first grating polarizing layer and the pixel electrode are integrally formed in the implementation structure, wherein the pixel electrode simultaneously serves as a first grating polarizing layer, or the first grating polarizing layer simultaneously serves as a pixel electrode. As shown in FIGS. 19 and 20, the array substrate of the implementation structure includes:

a first base 10;

grating lines 30 and gate electrodes 11 disposed on the base 10;

a first insulating layer 12 covering the grating line 30 and the gate electrode 11;

active layers 13, source electrodes 14, drain electrodes 15, data lines 40 and pixel electrodes 50 disposed on the first insulating layer 12, wherein a conductive channel is formed between the source electrode 14 and the drain electrode 15, and the pixel electrode 50 is located in an effective display area and is connected to the drain electrode 15, and wherein the pixel electrode 50 is provided with a plurality of elongated strip grooves disposed in parallel and periodically arranged so that the pixel electrode 50 also serves as the first grating polarizing layer 100, the first grating polarizing layer 100 is used to realize the polarizing function during display, and is also used to optically align the first alignment layer 102 by the transmitted polarized light during the alignment processing, such that the optical alignment direction of the first alignment layer 102 is parallel to or perpendicular to the transmission axis direction of the first grating polarizing layer 100;

a second insulating layer 16 covering source electrodes 14, drain electrodes 15, data lines 40 and pixel electrodes 50;

common electrodes 60 disposed on the second insulating layer 16;

a third insulating layer 17 covering common electrodes 60; and the first alignment layer 102 disposed on the third insulating layer 17.

The fabricating process of the array substrate of the present implementation structure includes:

(1) forming a pattern of grating lines 30 and gate electrodes 11 on the first base 10;

(2) forming a pattern of the first insulating layer 12 and active layers 13;

(3) forming a pattern of source electrodes 14, drain electrodes 15, and data lines 40;

(4) forming a pattern of pixel electrodes 50, in which the pixel electrode 50 is provided with a plurality of elongated strip grooves disposed in parallel and periodically arranged, so that the pixel electrode 50 simultaneously serves as the first grating polarizing layer 100;

(5) forming a pattern of the second insulating layer 16 and common electrodes 60;

(6) forming a third insulating layer 17, and performing processes such as coating alignment liquid, drying, ultraviolet light irradiation, and the like to form the first alignment layer 102, which is the same as the treatment in the above-described implementation structure.

The pixel electrode and the first grating polarizing layer of the integrated structure may be made of a transparent conductive material, such as indium tin oxide ITO, indium zinc oxide IZO, graphene, nano silver wire, metal mesh, or the like. It should be noted that the foregoing is merely illustrative that is not limited thereto, and other materials may be used, which is not limited in this embodiment.

The array substrate of the present implementation structure can also achieve the same technical effects as that of the foregoing implementation structure, which not only achieves the self-alignment between the alignment layer and the polarizer, but also completely eliminates the deviation of the transmission axis direction of the polarizer and the alignment direction of the alignment layer which are prone to the existing structure, solves the problems of dark state light leakage, low light transmission efficiency and low contrast ratio in the existing structure, improves light transmission efficiency and contrast ratio, realizes the alignment processing in multiple directions on the array substrate, and effectively reduces the overall thickness of the display panel.

Although the first grating polarizing layer is disposed in the same layer as that of the grating line and the gate electrode, and the first grating polarizing layer and the pixel electrode are integrally formed in the implementation structure so as to illustrate the implementation structure of the array substrate, it can be seen based on the technical concept of the embodiment that, the first grating polarizing layer may also be disposed in the same layer as that of the data line, and is formed by the same patterning process. The first grating polarizing layer may also be integrated with the common electrode, which may simultaneously serves as a first grating polarizing layer, or the first grating polarizing layer simultaneously serves as a common electrode. Although the structure of the array substrate is illustrated by taking the ADS display mode as an example in this embodiment, it can be seen from the technical concept of the embodiment that, the technical solution of the embodiment is also applicable to other display modes, such as Twisted Nematic (TN) display mode or In Plane Switching (IPS) display mode, and those skilled in the art can provide the first grating polarizing layer according to the structural characteristics of the corresponding display mode. Meanwhile, the thin film transistor in the array substrate of the embodiment may be an amorphous silicon thin film transistor, an oxide semiconductor thin film transistor, or a low temperature polysilicon thin film transistor, and the thin film transistor may be in a bottom gate structure or a top gate structure. For example, when the array substrate is in the structure of an amorphous silicon thin film transistor or an oxide semiconductor thin film transistor, the array structure layer may include: a first base; grating lines and gate electrodes disposed on the first base; a gate insulating layer covering the grating line and the gate electrode; active layers, source electrodes, drain electrodes, data lines, and pixel electrodes disposed on the gate insulating layer; a passivation layer covering the above pattern; and common electrodes disposed on the passivation layer. In another example, when the array substrate is in the structure of a low temperature polysilicon thin film transistor, the array structure layer includes: a first base; a buffer layer disposed on the first base; an active layer disposed on the buffer layer; and a gate insulating layer covering the active layer; grating lines and gate electrodes disposed on the gate insulating layer; an interlayer insulating layer covered with the grating line and the gate electrode; pixel electrodes disposed on the interlayer insulating layer; an over coating covering the pixel electrode; source electrodes, drain electrodes and data lines disposed on the over coating; a passivation layer covering source electrodes, drain electrodes and data lines; and common electrodes disposed on the passivation layer. Meanwhile, in the above existing structure layer, the first grating polarizing layer may be separately disposed at any layer position of the array structure layer, or may be disposed in the same layer as a certain film layer of the array structure layer, or may be integrated with a certain film layer of the array structure layer. Those skilled in the art can carry out the corresponding design according to the related art, and details thereof will not be repeated herein.

Figure 21:
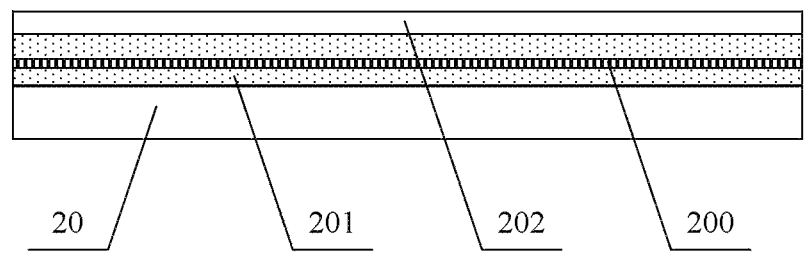
FIG. 21 is a schematic structural view of a color filter substrate according to another embodiment of the present disclosure.

In another embodiment of the present disclosure, the display substrate is a color filter substrate. FIG. 21 is a schematic structural view of a color filter substrate according to another embodiment of the present disclosure. As shown in FIG. 21, the color filter substrate of the present embodiment includes a second base 20, a color filter structure layer 201 disposed on the second base 20, and a second alignment layer 202 located on a surface at a side of the color filter structure layer 201 away from the second base 20, i.e., the color filter structure layer 201 and the second alignment layer 202 are stacked on the second base 20. A second film polarizing layer 200 is disposed in the color filter structure layer 201, and the second grating polarizing layer 200 is used to realize the polarizing function during display, and is further used to optically align the second alignment layer 202 by the transmitted polarized light during the alignment processing, so that the optical alignment direction of the second alignment layer 202 is parallel to or perpendicular to the transmission axis direction of the second grating polarizing layer 200. In actual implementation, the second alignment layer 202 may also be located on a surface at a side of the second base 20 away from the color filter structure layer 201.

The color filter structure layer 201 includes a black matrix, a color photoresist, an over coating, etc. The second alignment layer 202 is an optical alignment layer to enable liquid crystal molecules to have an initial deflection angle. The second grating polarizing layer 200 includes a plurality of grating strips disposed in parallel and arranged periodically, is disposed in an effective display area (sub-pixel opening area) in each sub-pixel, and has two functions, one of which is to realize polarizing function during display so as to act as a polarizer through which linearly polarized light passes, and the other of which is to optically align the first alignment layer 202 by the transmitted polarized light when the first alignment layer 202 is optically aligned, so that the optical alignment direction of the first alignment layer 202 is parallel to or perpendicular to the transmission axis direction of the first grating polarizing layer 200.

In this embodiment, the polarization principle of the second polarization grating is the same as the polarization principle and structure of the first polarization grating in the previous embodiment. A grating period of the second grating polarizing layer is smaller than a given electromagnetic wave wavelength, and a duty ratio is 0.3 to 0.7. The given electromagnetic wave wavelength is determined according to the wavelength required for photocuring of the second alignment layer material. The grating period P refers to a sum of the width of the grating strip and the gap between grating strips in the direction in which the grating strips are arranged (perpendicular to the length direction of the grating strip), and the duty ratio refers to a ratio of the width of the grating strip to the grating period. Optionally, the grating period is set to be less than 400 nm and the duty ratio is 0.4 to 0.6. Further, optionally, the grating period is set to be 180 nm to 220 nm, and the duty ratio is 0.5. The material of the second grating polarizing layer may be a metal material or a non-metal material commonly used in the field of display technologies. The metal material includes aluminum (Al), silver (Ag), molybdenum (Mo), gold (Au), copper (Cu), chromium (Cr), or the like, and the non-metal material includes silicon nitride SiNx, silicon oxide SiOx, silicon oxynitride Si(ON)x, acryl resin, polyimide resin, black matrix material, or the like. A transparent conductive material such as indium tin oxide ITO or indium zinc oxide IZO may also be used. It should be noted that the foregoing is merely illustrative that is not limited thereto, and other materials may be used, which are not limited in this embodiment.

In this embodiment, the second grating polarizing layer may be separately disposed at any layer position of the array structure layer, or may be disposed in the same layer as a certain film layer of the array structure layer, or may be integrated with a certain film layer of the array structure layer. For example, the second grating polarizing layer may be separately disposed on the second base, or may be disposed in the same layer as that of the black matrix. In addition, the second grating polarizing layer may be fabricated by manners including, but not limited to, nanoimprinting, 3D printing, patterning, and the like.

In the second grating polarizing layer of the embodiment, the grating strips may be in a strip-shaped body combined structure, and the plurality of strip-shaped bodies are sequentially arranged to form grating strips disposed in parallel and periodically arranged. The slit structure may also be used, in which a plurality of elongated strip grooves are formed on the plate body to form a plurality of grating strips disposed in parallel and periodically arranged. Further, the grating strip may have a linear shape and may extend in one direction, or may have a polygonal line shape and extend in two or more directions to meet the requirements of the two domain or multi domain pixel structure.

Figure 22:
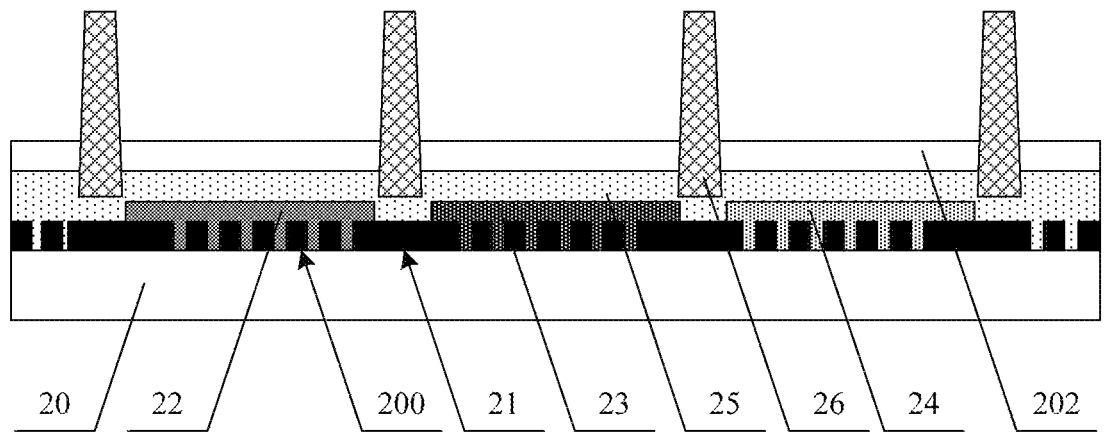
FIG. 22 is a schematic view of an implementation structure of a color filter substrate according to another embodiment of the present disclosure.

FIG. 22 is a schematic view of an implementation structure of a color filter substrate according to another embodiment of the present disclosure, illustrating a structure of three sub-pixels of red (R), green (G), blue (B) of the color filter substrate. As shown in FIG. 22, the color filter substrate of the present implementation structure includes:

a second base 20;

black matrices 21 and second grating polarizing layers 200 disposed on the base 20, the second grating polarizing layer 200 being located in an effective display area for realizing a polarizing function during display and also optically aligning the second alignment layer 202 by the transmitted polarized light during the alignment processing, so that the optical alignment direction of the second alignment layer 202 is parallel to or perpendicular to the transmission axis direction of the second grating polarizing layer 200;

a red photoresist 22, a green photoresist 23 and a blue photoresist 24 disposed on the second grating polarizing layer 200;

an over coating 25 covering the black matrix 21, the red photoresist 22, the green photoresist 23, and the blue photoresist 24;

the second alignment layer 202 and spacer columns 26 disposed on the over coating 25, the alignment direction of the second alignment layer 202 being parallel to or perpendicular to the transmission axis direction of the second grating polarizing layer 200.

In the implementation structure, the second grating polarizing layer 200 is disposed in the same layer as that of the Black Matrix (BM) 21, and is formed by the same patterning process, and is located in the effective display area of each sub-pixel. The shape of the grating strip in the second grating polarizing layer 200 is linear. The red photoresist 22, the green photoresist 23 and the blue photoresist 24 together form a Color Filter layer (CF), and structures of an Over Coating (OC) 25 and spacer columns (PS) 26 are the same as that of the existing color filter substrate.

The technical solution of the implementation structure will be further described below by the fabricating process of the color filter substrate of the implementation structure. The "photolithography process" referred to in the present embodiment includes coating a film layer, mask exposure, development, and the like, which are mature fabricating processes in the related art.

Figure 23:
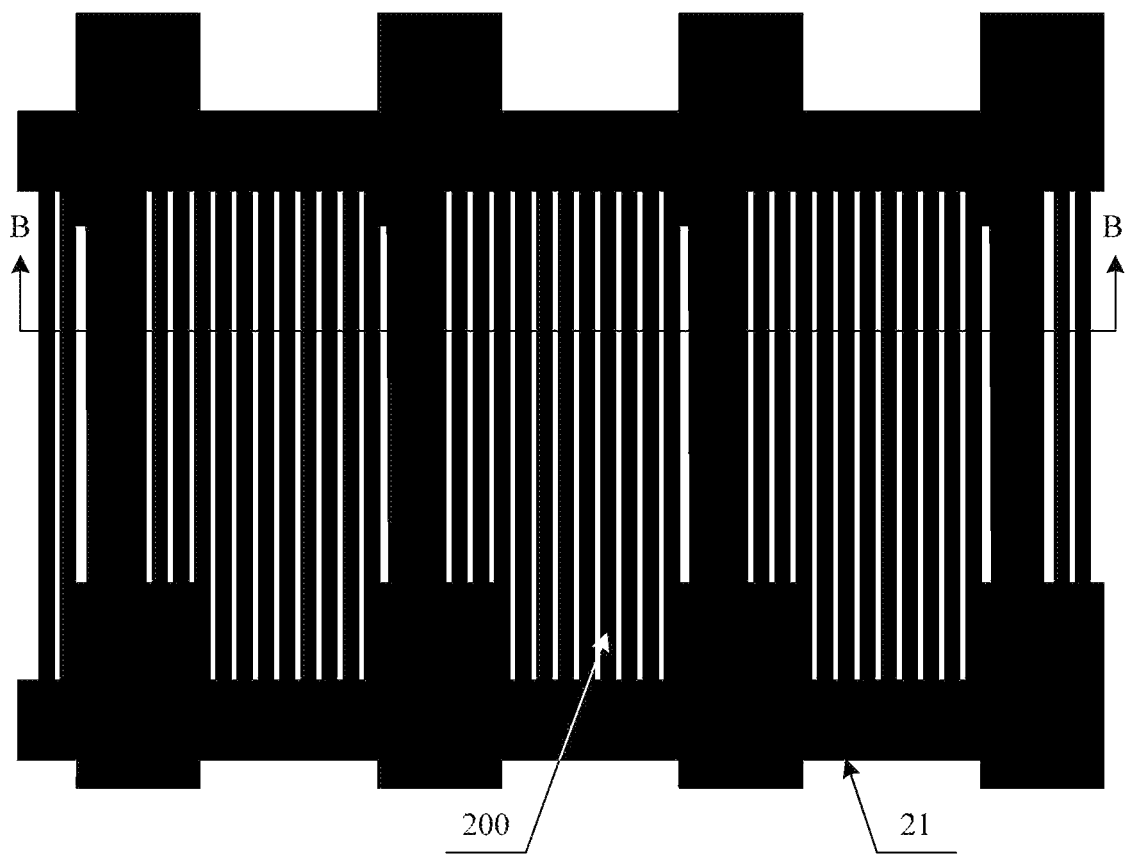
FIG. 23 is a schematic view after forming a pattern of second grating polarizing layers and black matrices according to another embodiment of the present disclosure.
Figure 24:
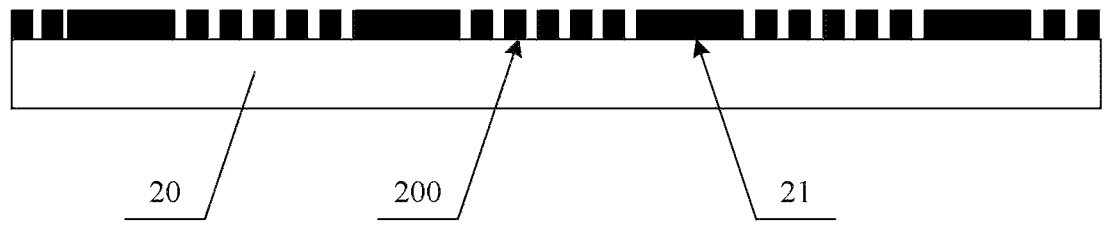
FIG. 24 is a cross-sectional view taken along line B-B of FIG. 23.

(1) Forming a pattern of second grating polarizing layers and black matrices on the second base. Forming a pattern of second grating polarizing layers and black matrices on the second base includes: coating a black matrix thin film on the second base, exposing and developing the black matrix thin film by using a monotone mask, forming a pattern of second grating polarizing layers 200 and black matrices 21 on the second base 20. The second grating polarizing layer 200 is located in the effective display area of each sub-pixel, and includes a plurality of grating strips disposed in parallel and periodically arranged, as shown in FIGS. 23 and 24, and FIG. 24 is a cross-sectional view taken along the line B-B in FIG. 23.

Figure 25:
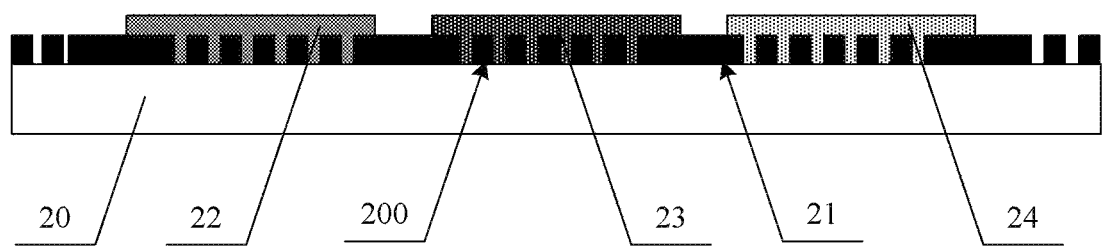
FIG. 25 is a schematic view after forming a pattern of a color filter layer according to another embodiment of the present disclosure.

(2) Forming a pattern of a color filter layer. Forming a pattern of a color filter layer includes: on the second base on which the foregoing pattern is formed, sequentially coating a red photoresist material on the effective display region of the red sub-pixel, coating a green photoresist material on the effective display region of the green sub-pixel, and coating a blue photoresist material on the effective display area of the blue sub-pixel to form a red photoresist 22 pattern, a green photoresist 23 pattern and a blue photoresist 24 pattern, three photoresist patterns being respectively formed between black matrices 21, and are disposed in the regular arrangement. Since the second grating polarizing layer 200 is also disposed in the effective display area of each sub-pixel, the red photoresist 22, the green photoresist 23, and the blue photoresist 24 are equivalently formed on the second grating polarizing layer 200, as shown in FIG. 25.

Subsequently, a pattern of an over coating 25 and spacer columns 26 is formed on the second base on which the foregoing pattern is formed, and an alignment liquid is coated on the over coating 25, the conventional pre cure/main cure, and ultraviolet light irradiation from the bottom surface of the second base 20 (the surface of the second base 20 away from the respective structure layer) are sequentially performed, and finally a conventional postabake process is performed to form a second alignment layer 202 on the second base 20. Since the color filter substrate of the embodiment is provided with the second grating polarizing layer 200 that reflects the TE polarized light and transmits the TM polarized light, the transmitted TM polarized light optically aligns the second alignment layer, so that the optical alignment direction of the second alignment layer 202 is parallel to or perpendicular to the transmission axis direction of the second grating polarizing layer 200. If the second alignment layer is made of a photodegradable type alignment material, the molecular chain parallel to the transmission axis direction of the second grating polarizing layer is broken and only the long-chain structure in the vertical direction is retained when the photodegradable type alignment material is irradiated by polarized light, so that the optical alignment direction of the second alignment layer is perpendicular to the transmission axis direction of the second grating polarizing layer; if the second alignment layer is made of a photopolymerizable type alignment material, molecules parallel to the transmission axis direction of the second grating polarizing layer are polymerized to form a long-chain when the photopolymerizable type alignment material is irradiated by polarized light, so that the optical alignment direction of the second alignment layer is parallel to the transmission axis direction of the second grating polarizing layer. Unlike the related art, the ultraviolet light source used in the present embodiment is non-polarized ultraviolet light, and the related art generally uses polarized light for irradiation.

It can be seen from the fabricating process of the color filter substrate of the present implementation structure that, as the second grating polarizing layer is disposed in the color filter substrate in the present implementation structure, the second grating polarizing layer is not only used for the polarizing function during display and the optical alignment of the second alignment layer by the transmitted polarized light during the alignment processing, so that the optical alignment direction of the second alignment layer is parallel to or perpendicular to the transmission axis direction of the second grating polarizing layer. That is, the present implementation structure realizes the self-alignment between the alignment layer and the polarizer, completely eliminating the deviation of the transmission axis direction of the polarizer and the alignment direction of the alignment layer which are prone to the existing structure, solving the problems of dark state light leakage, low light transmission efficiency and low contrast ratio in the existing structure, and improving light transmission efficiency and contrast ratio. At the same time, the implementation structure can realize the two domain or multi domain pixel structure and also facilitate the implementation of the MMG technology by performing the alignment processing on the color filter substrate in multiple directions, which has been described in detail in the foregoing embodiment and would not be repeated herein.

Also, in the implementation structure, second grating polarizing layers are integrated in the color filter substrate, and the second grating polarizing layer can realize a function of selecting linear polarized light to pass through, and the polarizer embedded in the color filter substrate is used to replace the external polarizer of the existing structure. After the color filter substrate and the array substrate are celled, the outer side of the color filter substrate does not need to be attached to the polarizer, and the structure such as the TAC sheet and the adhesive layer for ensuring the normal operation of the polarizer is also not required, which not only effectively reduces the overall thickness of the display panel to realize lightening and thinning of the display panel, but eliminates the complicated attaching operation, simplifies the fabricating equipment and process, reduces the production cost, avoids the problem of polarizer warpage in the reliability test of the product, and eliminates the poor visual experience and abnormal display caused by scratch and aging of the polarizer.

Further, the number of patterning times of the color filter substrate fabricated by the implementation structure is the same as that of the existing fabricating method, and the process flow is the same as the existing fabricating process. Therefore, it is not necessary for the implementation of the embodiment to change the existing process flow and the existing process equipment, and the present embodiment has good process compatibility, strong practicability, and good application prospects.

Although the second grating polarizing layer is fabricated by photolithography as an example to illustrate the technical solution of the embodiment, in actual implementation, the second grating polarizing layer of the embodiment can also be fabricated by other methods, such as printing, 3D printing or laser scanning, etc. In actual implementation, the number of patterning processes described above may also be adjusted according to actual needs. For example, the process of forming the second grating polarizing layer and the black matrix may be performed by two processes, i.e., first forming the black matrix by one process, and then forming the second grating polarizing layer by another process, or first forming a second grating polarizing layer by one process and then forming the black matrix by another patterning process. Thus, the second grating polarizing layer and the black matrix can be made of different materials and/or may be fabricated by different processes. The color filter substrate may further include other film layers. For example, with respect to a display panel that forms a TN display mode, the color filter substrate may further include common electrodes, which can be known by those skilled in the art according to the common knowledge and the related art, and will not be specifically limited herein.

In this embodiment, the implementation structure of the color filter substrate is illustrated by taking the second grating polarizing layer and the black matrix in the same layer as an example. However, according to the technical concept of the embodiment, the second grating polarizing layer may also be disposed in the same layer as that of the transparent electrode disposed inside or outside the second base, and formed by one patterning process or formed integrally with the transparent electrode according to the specific display structure.

Figure 26:
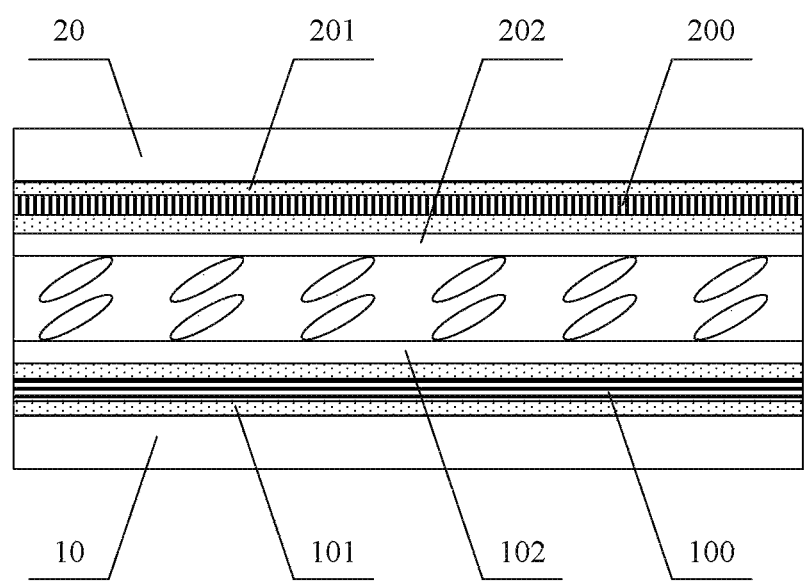
FIG. 26 is a schematic structural view of a display panel according to an embodiment of the present disclosure.

Moreover, the present disclosure provides still another embodiment. FIG. 26 is a schematic structural view of a display panel according to an embodiment of the present disclosure. As shown in FIG. 26, the main structure of the display panel includes an array substrate and a color filter substrate that are disposed in a cell manner, and a liquid crystal layer is disposed between the array substrate and the color filter substrate. The array substrate adopts the structure of one of the foregoing embodiments, and includes a first base 10, an array structure layer 101 disposed on a surface at a side of the first base 10 facing towards the color filter substrate, and a first alignment layer 102 on the surface at a side of the array structure layer 101 facing towards the color filter substrate. A first grating polarizing layer 100 is disposed in the array structure layer 101. The first grating polarizing layer 100 is used for realizing a polarizing function during display, and is also used for optically aligning the first alignment layer by the transmitted polarized light during the alignment processing, so that the optical alignment direction of the first alignment layer is parallel to or perpendicular to the transmission axis direction of the first grating polarizing layer. The color filter substrate adopts the structure of the foregoing embodiment, and includes a second base 20, a color filter structure layer 201 disposed on a surface at a side of the second base 20 facing towards the array substrate, and a second alignment layer 202 disposed on a surface at a side of the color filter structure layer 201 facing towards the array substrate. The color filter structure layer 201 is provided with a second grating polarizing layer 200 for performing a polarizing function during display, and also for optically aligning the second alignment layer 202 by the transmitted polarized light during the alignment processing so that the optical alignment direction of the second alignment layer 202 is parallel to or perpendicular to the transmission axis direction of the second grating polarizing layer 200.

Figure 27:
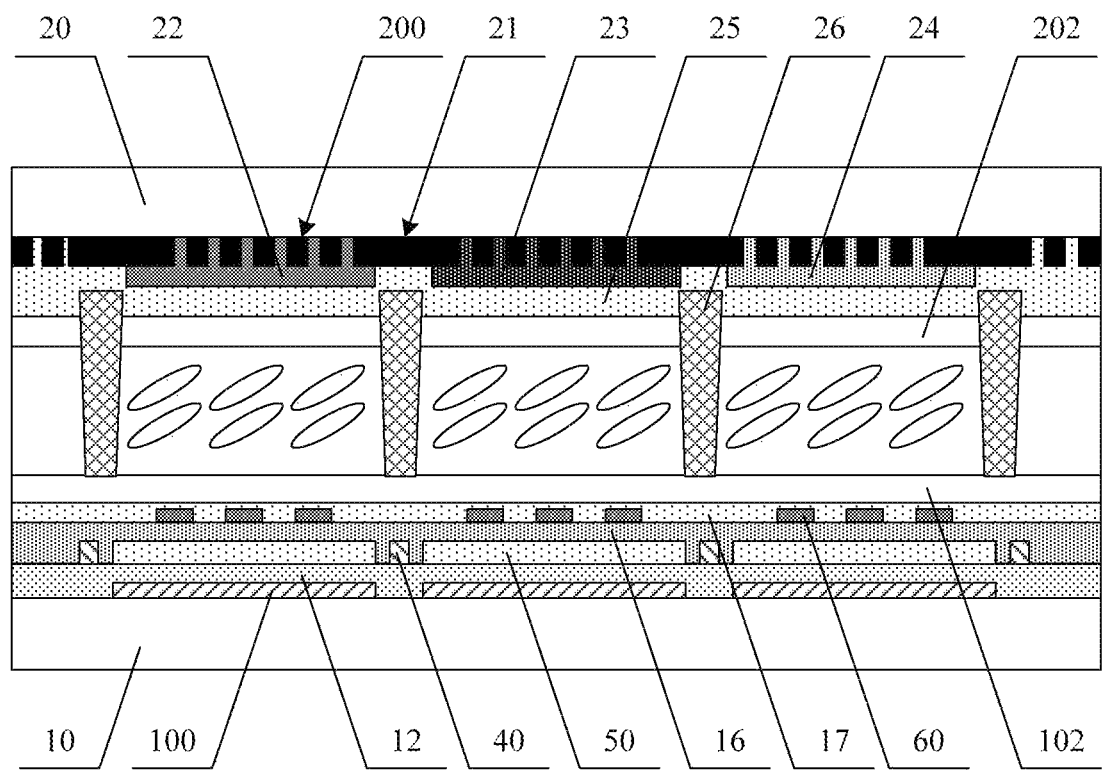
FIG. 27 is a schematic view of one implementation structure of a display panel according to the present disclosure.

FIG. 27 is a schematic view showing an implementation structure of a display panel of the present disclosure. The transmission axis directions of the first grating polarizing layer 100 in the array substrate and the second grating polarizing layer 200 in the color filter substrate are perpendicular to each other to ensure normal image display. The specific structure of the array substrate has been described in detail in the foregoing embodiment, and the specific structure of the color filter substrate has been described in detail in the foregoing another embodiment, so that details thereof are not repeated herein.

The fabricating process of the display panel of the embodiment includes: separately fabricating an array substrate and a color filter substrate, wherein the array substrate includes a first grating polarizing layer and a first alignment layer that is optically aligned, and the color filter substrate includes a second grating polarizing layer and a second alignment layer that is optically aligned; then, dispensing liquid crystal on a display area of the array substrate, coating a sealant on the non-display area of the color filter substrate, aligning the color filter substrate with the array substrate, and pressing under vacuum and curing the sealant to form a display panel.

In actual implementation, materials of the first alignment layer and the second alignment layer may be provided according to actual conditions such as display mode. For example, if alignment directions of both the first alignment layer and the second alignment layer are required to be the same, since the transmission axis directions of the first grating polarizing layer and the second grating polarizing layer are perpendicular to each other, the first alignment layer may be made of a photodegradable type alignment material, and the second alignment layer may be made of a photopolymerizable type alignment material; or the first alignment layer may be made of a photopolymerizable type alignment material and the second alignment layer may be made of a photodegradable type alignment material, so that the alignment direction of the first alignment layer is the same as the alignment direction of the second alignment layer. For another example, if alignment directions of the first alignment layer and the second alignment layer are required to be perpendicular to each other, since the transmission axis directions of the first grating polarizing layer and the second grating polarizing layer are perpendicular to each other, both the first alignment layer and the second alignment layer may be made of a photodegradable type alignment material, or both the first alignment layer and the second alignment layer may be made of a photopolymerizable type alignment material, so that the alignment direction of the first alignment layer and the alignment direction of the second alignment layer are perpendicular to each other.

The display panel provided in this embodiment may be any product or component having a display function, such as a mobile phone, a tablet computer, a television, a display, a notebook computer, a digital photo frame, a navigator, and the like.

The display panel of the embodiment achieves the same technical effects as that of the foregoing embodiment, which not only achieves the self-alignment between the alignment layer and the polarizer, but also completely eliminates the deviation of the transmission axis direction of the polarizer and the alignment direction of the alignment layer which are prone to the existing structure, solving the problems of dark state light leakage, low light transmission efficiency and low contrast ratio in the existing structure, and improving light transmission efficiency and contrast ratio, effectively reducing the overall thickness of the display panel, and realizing lightening and thinning of the display panel.

Based on the technical concept of the foregoing embodiments, an embodiment of the present disclosure further provides a fabricating method of a display substrate, including:

forming a display structure layer on the base, in which a grating polarizing layer is formed; and coating an alignment liquid, irradiating with ultraviolet light from a surface at a side of the base away from the alignment liquid to form an alignment layer, and an optical alignment direction of the alignment layer being parallel to or perpendicular to a transmission axis direction of the grating polarizing layer.

The grating polarizing layer is formed in an effective display area in each sub-pixel, and has two functions, one of which is to realize polarizing function during display so as to act as a polarizer through which linearly polarized light passes, and the other of which is to optically align the alignment layer by the transmitted polarized light when the alignment layer is optically aligned, so that the optical alignment direction of the alignment layer is parallel to or perpendicular to the transmission axis direction of the grating polarizing layer. The grating polarizing layer has a grating period of less than 400 nm with a duty ratio of 0.4 to 0.6. Optionally, the grating period is from 180 nm to 220 nm and the duty ratio is 0.5.

The grating polarizing layer includes a plurality of grating strips disposed in parallel and periodically arranged, and the shape of the grating strip includes a linear shape or a polygonal line shape. The alignment layer includes a photodegradable type material, and the optical alignment direction of the alignment layer is perpendicular to the transmission axis direction of the grating polarizing layer; or the alignment layer includes a photopolymerizable type material, and the alignment direction of the optical alignment layer is parallel to the transmission axis direction of the grating polarizing layer.

The grating polarizing layer is used for realizing a polarizing function during display, and is also used for optically aligning the alignment layer by transmitted polarized light during alignment processing, so that the ultraviolet light enables the optical alignment direction of the alignment layer being parallel to or perpendicular to the transmission axis direction of the grating polarizing layer via the grating polarizing layer.

The alignment layer includes a photodegradable type material, and the optical alignment direction of the alignment layer is perpendicular to the transmission axis direction of the grating polarizing layer; or the alignment layer includes a photopolymerizable type material, and the alignment direction of the optical alignment layer is parallel to the transmission axis direction of the grating polarizing layer.

The ultraviolet light is unpolarized ultraviolet light.

The grating polarizing layer may be fabricated by manners including, but not limited to, nanoimprinting, 3D printing, patterning, and the like.

In one example, the display substrate includes an array substrate, and the display structure layer includes an array structure layer, and the fabricating method specifically includes:

S11: forming an array structure layer on the first base, wherein the array structure layer is provided with a first grating polarizing layer for selecting linearly polarized light to pass through; and S12: coating an alignment liquid on the array structure layer, irradiating with ultraviolet light from a surface at a side of the first base away from the array structure layer to form a first alignment layer, and optical alignment direction of the first alignment layer being parallel to or perpendicular to the transmission axis direction of the first grating polarizing layer.

In one implementation, the step S11 includes: forming first grating polarizing layers, grating lines and gate electrodes on the first base; forming a first insulating layer covering the first grating polarizing layer, the grating line and the gate electrode, and an active layer disposed on the first insulating layer; forming source electrodes, drain electrodes and data lines, in which a conductive channel is formed between the source electrode and the drain electrode; forming pixel electrodes connected to drain electrodes; forming a second insulating layer covering source electrodes, drain electrodes, data lines and pixel electrodes, and common electrodes disposed on the second insulating layer; forming a third insulating layer covering the common electrode.

In another implementation, the step S11 includes: forming grating lines and gate electrodes on the first base; forming a first insulating layer covering the grating line and the gate electrode, and an active layer disposed on the first insulating layer; forming source electrodes, drain electrodes and data lines, in which a conductive channel is formed between the source electrode and the drain electrode; forming pixel electrode connected to drain electrodes, in which the pixel electrode is provided with a plurality of elongated strip grooves disposed in parallel and periodically arranged, so that the pixel electrode simultaneously serves as a first grating polarizing layer; forming a second insulating layer covering source electrodes, drain electrodes, data lines and pixel electrodes, and common electrodes on the second insulating layer; forming a third insulating layer covering the common electrode.

The step S12 includes: coating an alignment liquid on the third insulating layer, sequentially performing the conventional pre cure/main cure and ultraviolet light irradiation from the bottom surface of the first base, and finally performing a conventional postabake process to form the first alignment layer, so that the optical alignment direction of the first alignment layer is parallel to or perpendicular to the transmission axis direction of the first grating polarizing layer.

In another example, the display substrate includes a color filter substrate, and the display structure layer includes a color filter structure layer, and the fabricating method specifically includes:

S21: forming a color filter structure layer on the second base, wherein the color filter structure layer is provided with a second grating polarizing layer for selecting linearly polarized light to pass through; and S22: coating an alignment liquid on the color filter structure layer, irradiating with ultraviolet light from a surface at a side of the second base away from the array structure layer to form a second alignment layer, and optical alignment direction of the second alignment layer being parallel to or perpendicular to the transmission axis direction of the second grating polarizing layer.

The step S21 includes: forming second grating polarizing layers and black matrices on the second base; sequentially forming a red photoresist, a green photoresist and a blue photoresist; forming an over coating and spacer columns.

The step S22 includes: coating an alignment liquid on the over coating, sequentially performing the conventional pre cure/main cure and ultraviolet light irradiation from the bottom surface of the second base, and finally performing a conventional postabake process to form the second alignment layer, so that the optical alignment direction of the second alignment layer is parallel to or perpendicular to the transmission axis direction of the second grating polarizing layer.

The specific fabricating process of the array substrate and the color filter substrate has been described in detail in the previous embodiments and will not be repeated herein.

The embodiment provides a fabricating method of a display substrate achieving the same technical effects as that of the foregoing embodiment, which not only achieves the self-alignment between the alignment layer and the polarizer, but also completely eliminates the deviation of the transmission axis direction of the polarizer and the alignment direction of the alignment layer which are prone to the existing structure, solving the problems of dark state light leakage, low light transmission efficiency and low contrast ratio in the existing structure, and improving light transmission efficiency and contrast ratio, effectively reducing the overall thickness of the display panel, and realizing lightening and thinning of the display panel. Further, the number of patterning times of the array substrate fabricated by the embodiment is the same as that of the existing fabricating method, and the process flow is the same as the existing fabricating process. Therefore, it is not necessary for the implementation of the embodiment to change the existing process flow and the existing process equipment, and the present embodiment has good process compatibility, strong practicability, and good application prospects.

Embodiments of the present disclosure provide a display substrate and a fabricating method thereof, and a display panel. By disposing a grating polarizing layer in the display substrate, the grating polarizing layer is used for realizing a polarizing function during display and also optically aligning the alignment layer by the transmitted polarized light during the alignment processing, so that the optical alignment direction of the alignment layer is parallel to or perpendicular to the transmission axis direction of the grating polarizing layer, thereby realizing self-alignment between the alignment layer and the polarizer, completely eliminating the deviation of the transmission axis direction of the polarizer and the alignment direction of the alignment layer which are prone to the existing structure, solving the problems of dark state light leakage, low light transmission efficiency and low contrast ratio in the existing structure, and improving light transmission efficiency and contrast ratio. In the meantime, the embodiment of the present disclosure can perform alignment processing on the display substrate in multiple directions, which can realize not only the two domain or multi domain pixel structure but also the implementation of the MMG technology. Further, in the embodiment of the present disclosure, the external polarizer of the existing structure is replaced by the internal polarizer, effectively reducing the overall thickness of the display panel, and realizing the lighting and thinning of the display panel. It is not necessary for the implementation of the embodiment to change the existing process flow and the existing process equipment, and the present embodiment has good process compatibility, strong practicability, and good application prospects.

Moreover, any product or method implementing the present disclosure is not necessarily to have all advantages described above at the same time. Other features and advantages of the present disclosure are set forth in the description of the specification, and could be partly apparent from the embodiments in the specification, or can be learned by implementing the present disclosure. The objectives and other advantages of the embodiments of the present disclosure can be realized and obtained by the structure particularly pointed out in the description, the claims, and the drawings.

In the description of the embodiments of the present disclosure, it should be understood that the term such as "middle", "upper", "lower", "front", "rear", "vertical", "horizontal", "top", "bottom", "inside", "outside" and other indications for orientation or positional relationship is based on the orientation or positional relationship shown in the drawings, and is merely to conveniently describe the present disclosure and to simplify the description, rather than indicating or implying that the referred device or component must be constructed and operated in a specific orientation, and is not to be construed as limitation of the present disclosure.

In the description of the embodiments of the present disclosure, it should be noted that the term such as "installation", "connection" and "coupling" are to be understood broadly unless otherwise clearly defined. For example, it may be a fixed connection, a detachable connection, or an integral connection; it may be a mechanical connection or an electrical connection; it may be a direct connection, or may be indirect connection via an intermediate member, or may be an inner communication between two components. The specific meanings of the above terms in the present disclosure can be understood in the specific circumstances by those skilled in the art.

The embodiments disclosed in the present disclosure are as described above, but are merely used to facilitate understanding of the present disclosure, and are not intended to limit the present disclosure. Any modification or variation in the form and details of the implementation may be made by those skilled in the art without departing from the spirit and scope of the present disclosure. However, the protection scope of the present disclosure should be still defined by the appended claims.

What is claimed is:

1. A display substrate, comprising:
a base, a display structure layer disposed on the base, and an alignment layer;
wherein a grating polarizing layer is disposed in the display structure layer, and an optical alignment direction of the alignment layer is parallel to or perpendicular to a transmission axis direction of the grating polarizing layer; and
wherein the grating polarizing layer comprises a plurality of polygonal-line-shaped grating strips disposed in parallel and periodically arranged, the grating polarizing layer forms different grating directions in the same sub-pixel or adjacent sub-pixels according to domains, and the alignment layer forms alignments in different directions in the same sub-pixel or adjacent sub-pixels to realize a two domain or multi domain pixel structure.

2. The display substrate according to claim 1, wherein a material of the grating polarizing layer comprises at least one of: aluminum, silver, molybdenum, gold, copper, chromium, silicon nitride, silicon oxide, silicon oxynitride, acryl resin, polyimide resin, black matrix material, indium tin oxide, and indium zinc oxide.

3. The display substrate according to claim 1, wherein the grating polarizing layer is disposed at an effective display area in each of sub-pixels, and the grating polarizing layer has a grating period of less than 400 nm with a duty ratio of 0.4 to 0.6.

4. The display substrate according to claim 1, wherein the alignment layer comprises a photodegradable type material, and the optical alignment direction of the alignment layer is perpendicular to the transmission axis direction of the grating polarizing layer.

5. The display substrate according to claim 1, wherein the alignment layer comprises a photopolymerizable type material, and the alignment direction of the optical alignment layer is parallel to the transmission axis direction of the grating polarizing layer.

6. The display substrate according to claim 1, wherein the display substrate comprises an array substrate, the display structure layer comprises an array structure layer, and grating lines or data lines in the grating polarizing layer and the array structure layer are disposed in the same layer and are formed by one patterning process.

7. The display substrate according to claim 1, wherein the display substrate comprises an array substrate, the display structure layer comprises an array structure layer, and pixel electrodes or common electrodes in the grating polarizing layer and the array structure layer are integrally formed and are formed by one patterning process.

8. The display substrate according to claim 1, wherein the display substrate comprises a color filter substrate, the display structure layer comprises a color filter structure layer, and black matrices in the grating polarizing layer and the color filter structure layer are disposed in the same layer and are formed by one patterning process.

9. A display panel, comprising:
a display substrate, comprising:
a base, a display structure layer disposed on the base, and an alignment layer;
wherein a grating polarizing layer is disposed in the display structure layer, and an optical alignment direction of the alignment layer is parallel to or perpendicular to a transmission axis direction of the grating polarizing layer; and wherein the grating polarizing layer comprises a plurality of polygonal-line-shaped grating strips disposed in parallel and periodically arranged, the grating polarizing layer forms different grating directions in the same sub-pixel or adjacent sub-pixels according to domains, and the alignment layer forms alignments in different directions in the same sub-pixel or adjacent sub-pixels to realize a two domain or multi domain pixel structure.

10. The display panel according to claim 9, wherein the display substrate comprises an array substrate, the display structure layer comprises an array structure layer, and grating lines or data lines in the grating polarizing layer and the array structure layer are disposed in the same layer and are formed by one patterning process.

11. The display panel according to claim 9, wherein the display substrate comprises an array substrate, the display structure layer comprises an array structure layer, and pixel electrodes or common electrodes in the grating polarizing layer and the array structure layer are integrally formed and are formed by one patterning process.

12. The display panel according to claim 9, wherein the display substrate comprises a color filter substrate, the display structure layer comprises a color filter structure layer, and black matrices in the grating polarizing layer and the color filter structure layer are disposed in the same layer and are formed by one patterning process.

13. A fabricating method of a display substrate comprising:

forming a display structure layer on a base in which a grating polarizing layer is formed; and coating an alignment liquid irradiated with ultraviolet light a surface at a side of the base away from the alignment liquid to form an alignment layer, an optical alignment direction of the alignment layer being parallel to or perpendicular to a transmission axis direction of the grating polarizing layer;

wherein the grating polarizing layer comprises a plurality of polygonal-line-shaped grating strips disposed in parallel and periodically arranged, the grating polarizing layer forms different grating directions in the same sub-pixel or adjacent sub-pixels according to domains, and the alignment layer forms alignments in different directions in the same sub-pixel or adjacent sub-pixels to realize a two domain or multi domain pixel structure.

14. The fabricating method according to claim 13, wherein the alignment layer comprises a photodegradable type material, and the optical alignment direction of the alignment layer is perpendicular to the transmission axis direction of the grating polarizing layer.

15. The fabricating method according to claim 13, wherein the alignment layer comprises a photopolymerizable type material, and the alignment direction of the alignment layer is parallel to the transmission axis direction of the grating polarizing layer.

16. The fabricating method according to claim 13, wherein the ultraviolet light is unpolarized ultraviolet light.

17. The fabricating method according to claim 13, wherein:

the display substrate comprises an array substrate, the display structure layer comprises an array structure layer, grating lines or data lines in the grating polarizing layer, and the array structure layer are disposed in the same layer and are formed by one patterning process; or pixel electrodes or common electrodes in the grating polarizing layer and the array structure layer are integrally formed and are formed by one patterning process.

18. The fabricating method according to claim 13, wherein the display substrate comprises a color filter substrate, the display structure layer comprises a color filter structure layer, and black matrices in the grating polarizing layer and the color filter structure layer are disposed in the same layer and are formed by one patterning process.

* * * * *